Aug. 4, 1959 J. E. VISTAIN, JR 2,898,111

PHONOGRAPH RECORD PLAYER TRIP MECHANISM

Filed May 25, 1953 17 Sheets-Sheet 1

Inventor
James E. Vistain, Jr.
By J. W. Douglas
Attorney

PHONOGRAPH RECORD PLAYER TRIP MECHANISM

Filed May 25, 1953 17 Sheets-Sheet 2

Inventor
James E. Vistain, Jr
By
J. D. Douglas
Attorney

Aug. 4, 1959 J. E. VISTAIN, JR 2,898,111

PHONOGRAPH RECORD PLAYER TRIP MECHANISM

Filed May 25, 1953 17 Sheets-Sheet 3

Inventor
James E. Vistain, Jr
By
J. M. Douglas
Attorney

PHONOGRAPH RECORD PLAYER TRIP MECHANISM

Filed May 25, 1953 17 Sheets-Sheet 4

Inventor
James E. Vistain, Jr.
By J. W. Douglas
Attorney

Aug. 4, 1959 J. E. VISTAIN, JR 2,898,111

PHONOGRAPH RECORD PLAYER TRIP MECHANISM

Filed May 25, 1953 17 Sheets-Sheet 5

Inventor
James E. Vistain, Jr.
By J. D. Douglas
Attorney

PHONOGRAPH RECORD PLAYER TRIP MECHANISM

Filed May 25, 1953

Inventor
James E. Vistain, Jr.
By
J. W. Douglas
Attorney

Inventor
James E. Vistain, Jr.
By
J. D. Douglas
Attorney

Aug. 4, 1959 J. E. VISTAIN, JR 2,898,111

PHONOGRAPH RECORD PLAYER TRIP MECHANISM

Filed May 25, 1953 17 Sheets-Sheet 8

Inventor
James E. Vistain, Jr.
By J. D. Douglas
Attorney

Aug. 4, 1959 J. E. VISTAIN, JR 2,898,111

PHONOGRAPH RECORD PLAYER TRIP MECHANISM

Filed May 25, 1953 17 Sheets-Sheet 9

Inventor
James E. Vistain, Jr.
By
J. W. Douglas
Attorney

Aug. 4, 1959 J. E. VISTAIN, JR 2,898,111

PHONOGRAPH RECORD PLAYER TRIP MECHANISM

Filed May 25, 1953 17 Sheets-Sheet 10

Inventor:
James E. Vistain, Jr
By J. D. Douglas
Attorney

Aug. 4, 1959 J. E. VISTAIN, JR 2,898,111

PHONOGRAPH RECORD PLAYER TRIP MECHANISM

Filed May 25, 1953 17 Sheets-Sheet 11

Inventor
James E. Vistain, Jr.
By J. W. Douglas
Attorney

Inventor
James E. Vistain, Jr
By J. W. Douglas
Attorney

PHONOGRAPH RECORD PLAYER TRIP MECHANISM

Filed May 25, 1953 17 Sheets-Sheet 13

Inventor
James E. Vistain, Jr.
By J. W. Douglas
Attorney

Aug. 4, 1959 J. E. VISTAIN, JR 2,898,111

PHONOGRAPH RECORD PLAYER TRIP MECHANISM

Filed May 25, 1953 17 Sheets-Sheet 14

Inventor
James E. Vistain, Jr.
By
J. W. Douglas
Attorney

Inventor
James E. Vistain, Jr
By
J. W. Douglas
Attorney

PHONOGRAPH RECORD PLAYER TRIP MECHANISM

Filed May 25, 1953 17 Sheets-Sheet 16

Inventor
James E. Vistain, Jr.
By J. W. Douglass
Attorney

Aug. 4, 1959 J. E. VISTAIN, JR 2,898,111

PHONOGRAPH RECORD PLAYER TRIP MECHANISM

Filed May 25, 1953 17 Sheets-Sheet 17

Inventor
James E. Vistain, Jr
By
J. W. Douglas
attorney

United States Patent Office 2,898,111

Patented Aug. 4, 1959

2,898,111

PHONOGRAPH RECORD PLAYER TRIP MECHANISM

James E. Vistain, Jr., Skokie, Ill., assignor to Admiral Corporation, Chicago, Ill., a corporation of Delaware Original application June 15, 1949, Serial No. 99,191. Divided and this application May 25, 1953, Serial No. 357,247

4 Claims. (Cl. 274—1)

This invention relates to new and useful improvements in phonograph record player mechanisms and more particularly to a record changer of the type where the records are disposed in a stack above the turntable and discharged successively, one at a time, onto a turntable. This application is a division of my copending application, Ser. No. 99,191 filed June 15, 1949 now Patent No. 2,801,109, issued July 30, 1957.

More specifically, the inventive features of the record player comprehend improvements by which the record changing mechanism is brought into operation by automatic triggering means adapted to be alternately operated by the eccentric runout grooves of one class of records, and by the spiral concentric runout groove of still another class.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description, serve to explain the principles of the drawings.

Figures 1, 2, 3, 4:
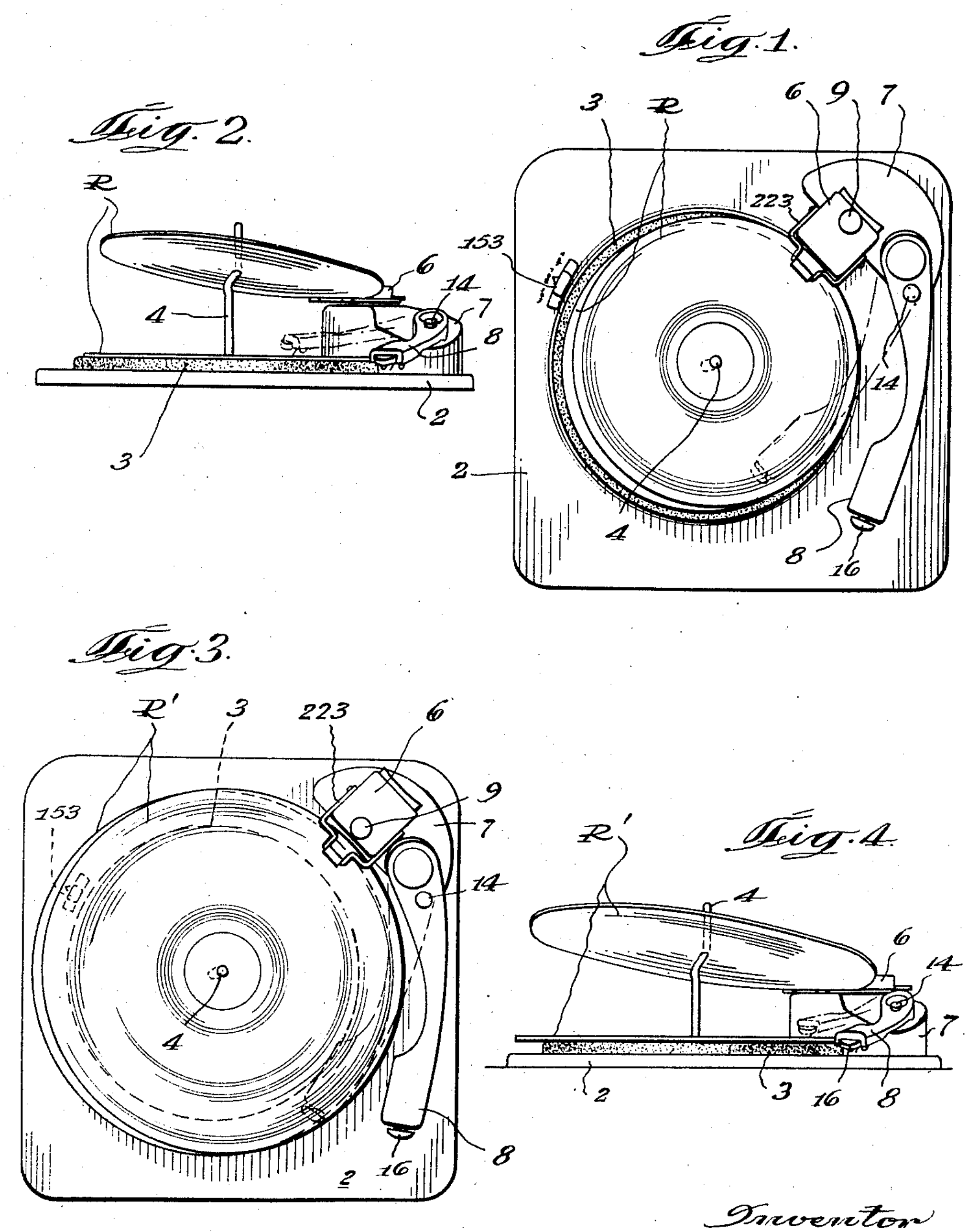
Fig. 1 is a top plan view.
Fig. 2 is a fragmentary side elevational view of a record player embodying the present invention, adjusted for reproducing conventional 10-inch records.
Figure 3 is a view corresponding to Fig. 1.
Fig. 4 is a view corresponding to Fig. 2 showing adjustments of the record player for playing conventional 12-inch records.

In the drawings, wherein for the purpose of illustration is shown one embodiment of the invention, Figs. 1 to 11 inclusive are intended to indicate the versatility of the record player for reproducing several classes of records. For example, in Figs. 1 and 2, wherein the character 2 denotes a chassis or base plate of any suitable formation, a supply of 10-inch records R are supported above a conventional turntable 3, on the base plate, by means of a shouldered spindle 4, centrally of the turntable, to provide support for the records at their center holes, and an ejector head 6 to provide support for the records at their peripheral edges, the ejector head being spaced from the base plate 2 by means including a bearing member 7 also serving the purpose of providing support for a pickup arm 8 in swingable relationship to the turntable.

In order that a supply or stack of 12-inch records R′ may be supported by the magazine means provided by spindle 4 and ejector head 6, said ejector is rotated through a half turn from its Fig. 1 position, rotation being about the vertical axis of a control knob 9 surmounting the ejector head.

Both 10-inch and 12-inch records just alluded to are of the conventional variety; that is, they have coarse sound grooves which terminate in spiral terminal grooves centrally thereof and are adapted to be reproduced when rotated at a speed of 78.26 revolutions per minute, reproduction being effected by engagement of their sound grooves by a needle or stylus, having a radius at the tip thereof of .003 or .004 of an inch and the weight of the pickup arm exerting a downward pressure of the needle on a record it is tracking of from 20 to 30 grams.

Novel features of the record player also comprehend means for automatically playing stacks of 70 inch records R″. This is carried into effect by providing means, to be later described, by which the spindle 4 is readily removable from the position in which it is indicated.

The spindle 4 is replaced by another removable spindle 11 which includes an upper vertical portion 12 (Fig. 7), over which the 7-inch records are threaded, to position the stack of records also in supported engagement with the ejector head 6, this being possible when the ejector head is turned to its Fig. 1 position and also due to an offset 13 in the spindle. Furthermore, manipulation of an adjustment handle 14 (Fig. 8) on the pickup arm 8 is adapted to provide for operative initial engagement of the 7-inch records by the pickup arm, the handle controlling mechanism later to be described.

Figures 5, 6, 7, 8, 9:
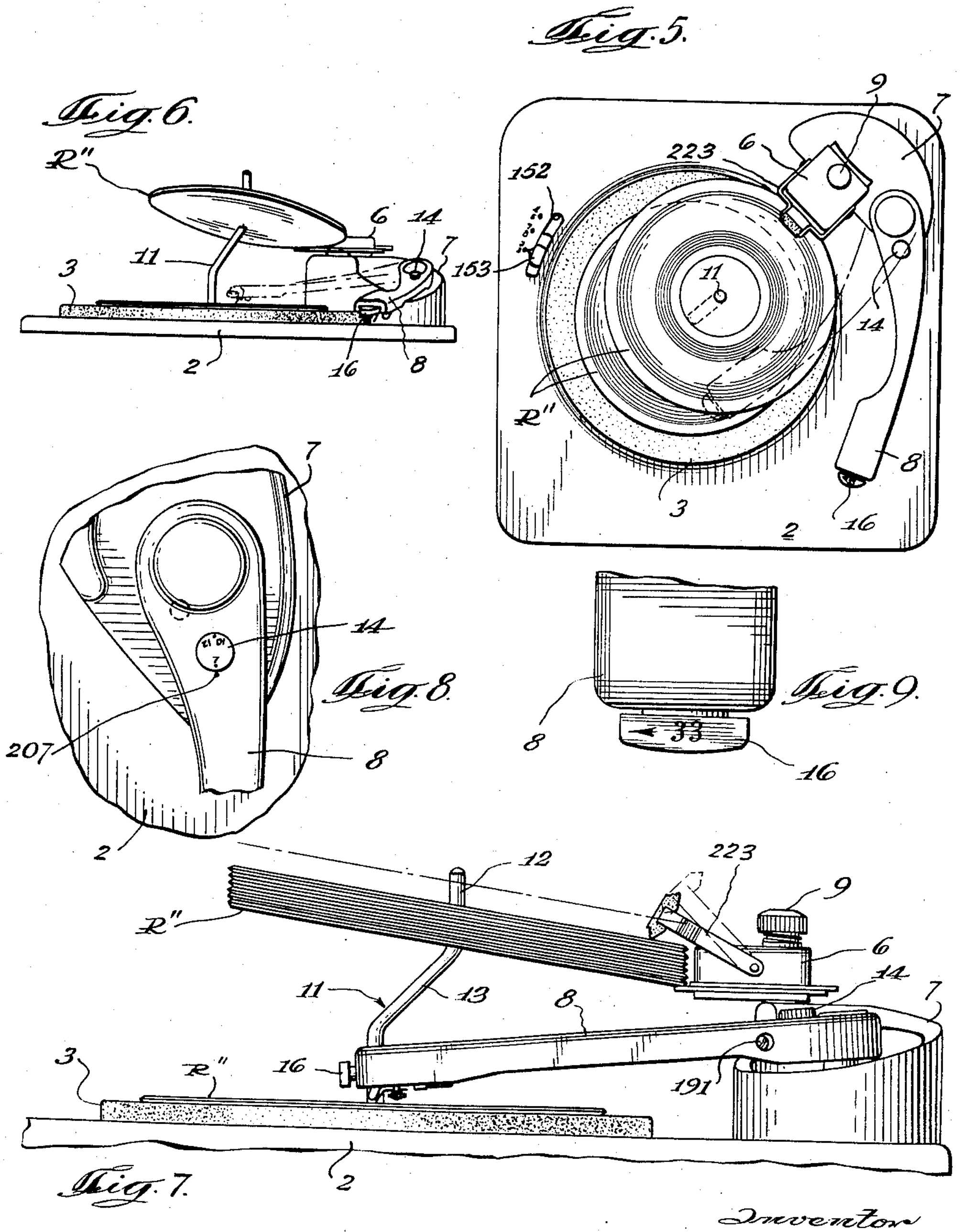
Fig. 5 is another view corresponding to Fig. 1 and Fig. 6 another view corresponding to Fig. 2 indicating the adjustment of the record player for reproducing 7-inch records.
Fig. 7 is still another side elevational view of the upper portion of the record player as viewed from a different direction.
Fig. 8 is a fragmentary top plan view showing elements of the record player including the pickup arm and an adjustment of the same.
Fig. 9 is a fragmentary top plan view showing the record engaging end of the pickup arm and the adjustment thereon.
Figure 11:
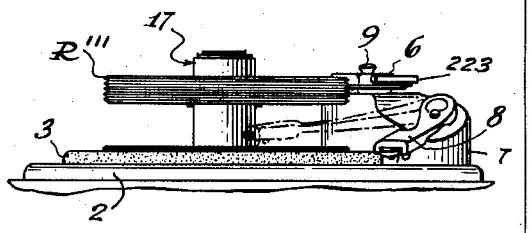
Fig. 11 is a view, corresponding to Fig. 2, showing the record player in readiness for reproduction of 7-inch diameter records having large center holes therein.
Figure 10:
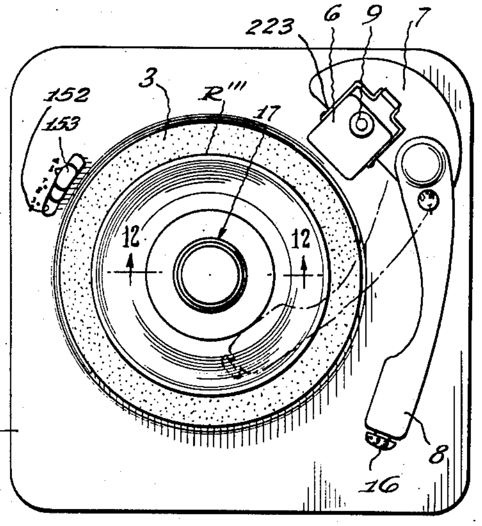
Fig. 10 is a top plan view, corresponding to Fig. 1.
Figure 20:
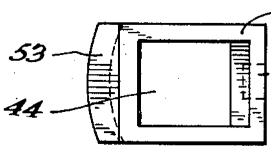
Fig. 20 is a top plan view of one of the record support members.

Although the 10-inch and 12-inch records are referred to as provided with coarse grooves, records of these diameters as well as the 7-inch records are also made with microgroove sound tracks on their surfaces which may also terminate in eccentric terminal grooves. The fine groove, or microgroove, of these records, however, is adapted to be engaged operatively, only by a needle or stylus having a radius at the tip thereof of about .001 of an inch, and the needle is held in engagement with the groove with a pressure of but 5 or 6 grams. Therefore, to provide for reproduction of records having coarse groove and/or microgrooves, the pickup arm is provided with a needle for both kinds of grooves. The needle which it is desired to use is moved into an operative position by means of a control handle 16 (Fig. 9). It is, of course, carried by a transducer, bearing the two needles, which will not be described since this feature forms the subject matter of my copending application filed on December 23, 1948, Serial No. 67,040.

*Spindles*

By means of another novel feature, the adaptability of the record player is further increased. This feature includes a spindle of large diameter of center post 17 (Figs. 10 and 11) which is adapted to be attached to the turntable in lieu of the spindles 4 and 11 which are anchored to other means, later to be described, and around either of which the turntable is adapted to turn. The center post includes magazine means thereon at a level higher than the level of the turntable for support of still another class of records R‴ having center holes approximately 1½ inches in diameter which are threaded over the center post. Records of this class are also 7 inches in diameter and adapted to be reproduced when rotated at a speed of 45 revolutions per minute. Sound is recorded on a record of this class in a microgroove, the inner end of which terminates in a spiral terminal groove.

Figures 19, 21, 22:
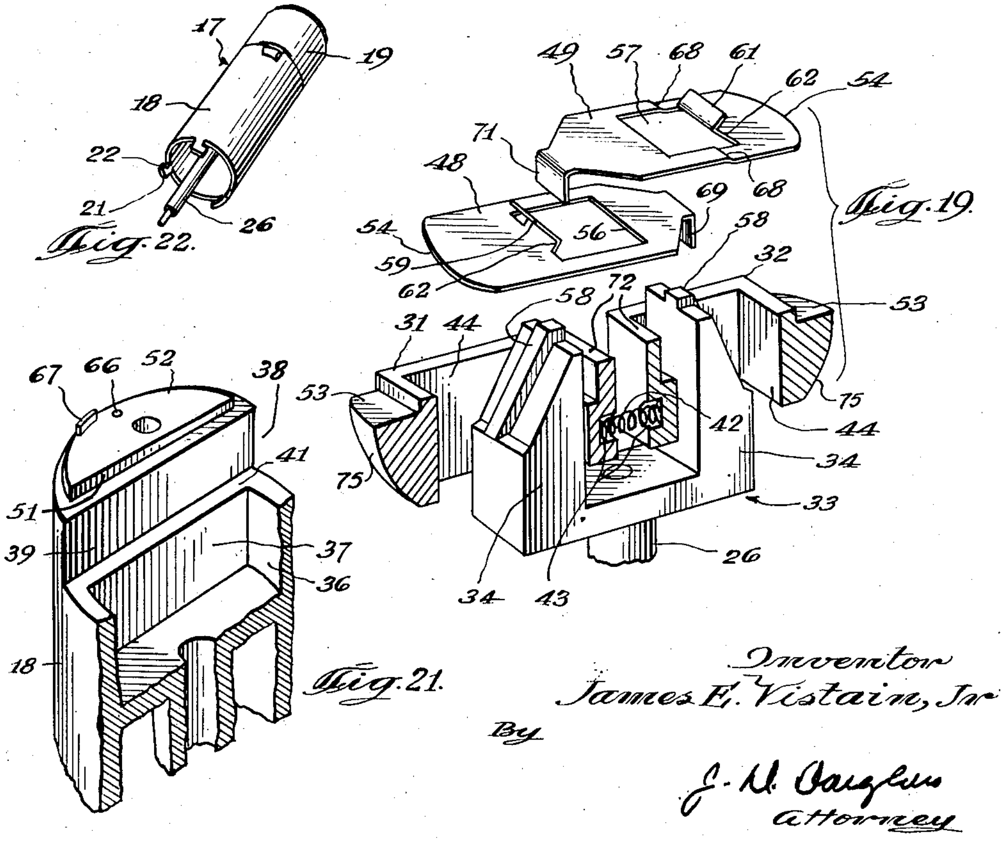
Fig. 19 is an exploded view of the record support members and mechanism for their operation, in perspective.
Fig. 21 is a fragmentary perspective view of the upper portion of the center post.
Fig. 22 is a perspective view of the center post in its entirety.
Figures 15, 16, 17, 18:
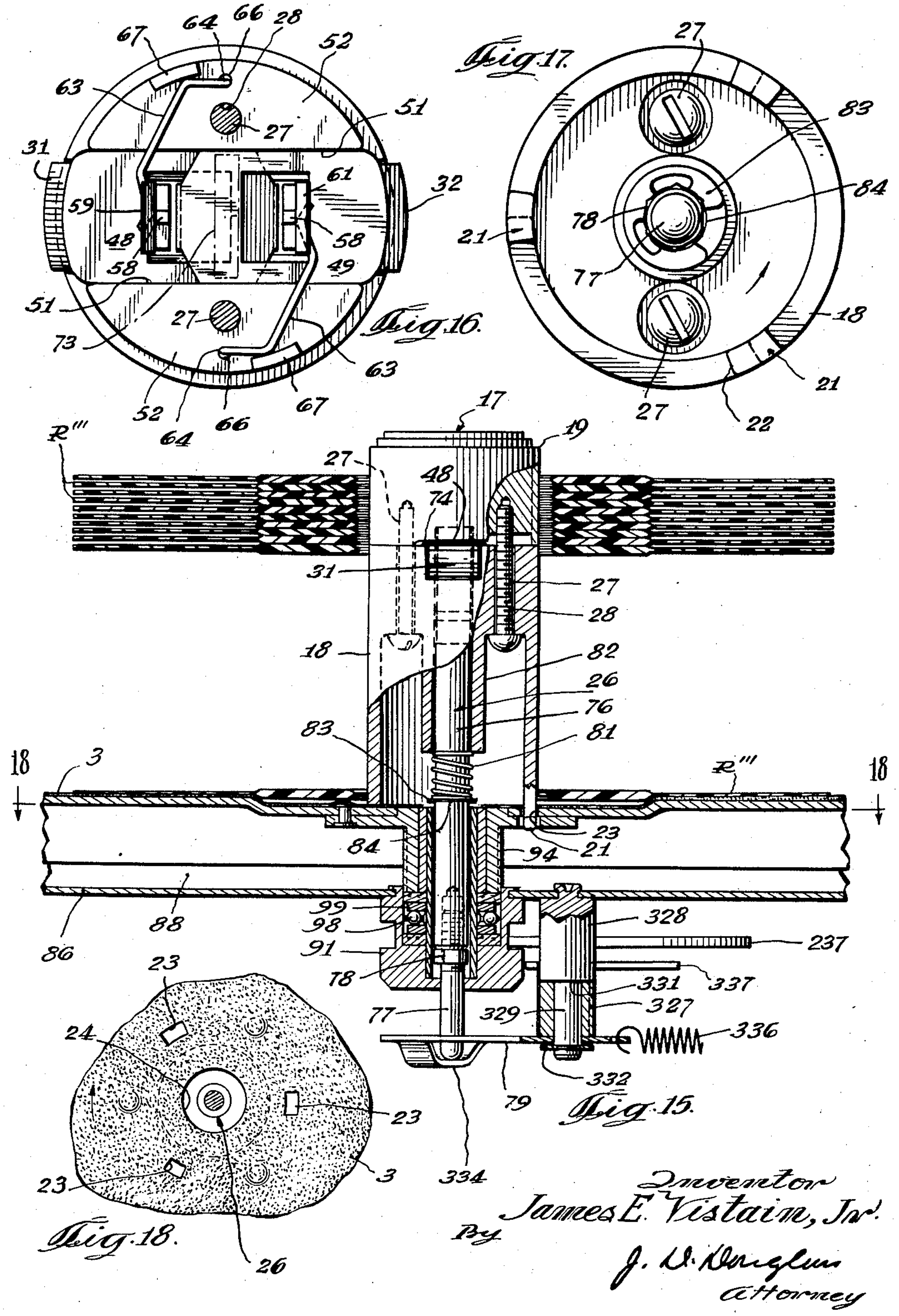
Fig. 15 is a view, partly in section and partly in elevation, showing mechanism including the center post and other mechanism by which the record support members thereof are operated.
Fig. 16 is a top plan view of mechanism of the center post, the cap portion thereof having been removed.
Fig. 17 is a bottom plan view of the center post.
Fig. 18 is a section on line 18—18 of Fig. 15.

The center post 17, as will be noted from Fig. 22, includes a substantially hollow body portion 18 and a cap portion 19. From the lower end of the body portion 18 a plurality of hooks 21, preferably three in number, extend downwardly, thence laterally in an arcuate direction to provide lug portions 22. The turntable 3 (Fig. 18) includes a plurality of apertures 23, which are arcuate of a center hole 24, in the turntable, and complementary to the hooks 21 on the center post. The center post also includes a reciprocatory element indicated in its entirety by the character 26, the structure and purpose of which will be indicated hereinafter. In order to lock the center post releasably to the turntable, the reciprocatory element 26 is passed through center hole 24, the hooks 21 then passed through the apertures 23 and a turning motion imparted to the center post to project the lugs 22 under the top of the turntable 3. Preferably, the lugs extend in a direction counter to the direction of rotation of the turntable so that when the hooks are passed through apertures 23, anchor surfaces provided by the turntable adjacent the apertures are immediately carried over the lugs 22 by motion of the turntable. Additional structural details of the center post 17 are indicated in Fig. 15 wherein will be noted the anchor screws 27 threaded in the cap 19 and in extension through holes 28 in the body portion 18.

As previously indicated, the records R‴ are supported solely from the center post 17 by means of retractable extended members 31 and 32 (Fig. 12) which may be retracted by motion of the reciprocatory element 26. In order that these operations may be effected, the element 26 is slidably journalled in the body portion 18 and includes at its upper end a bifurcated member 33 of rectangular transverse cross section having arms 34 extending upwardly. The arms 34 are, therefore, adapted to move vertically within a pocket 36 (Fig. 21), in the body portion 18, said pocket having parallel side walls 37 sufficiently intimate in association with the arms 33 to resist rotation of the reciprocatory element about its axis. Upwardly thereof, the pocket 36 opens into a channel 38 which extends diametrically of the body portion and is defined, in part, by parallel walls 39 extending verticaly from horizontal support surfaces 41 on either side of the pocket 36, since the channel 38 is of width greater than the width of pocket 36. The members 31 and 32 are slidably disposed in the channel 38 and are urged away from each other by a compression spring 42, the ends of which seat in pockets 43 in adjacent ends of the record support members. The extent to which the members 31 and 32 may be thus moved away from each other is limited, however, by the arms 34 which extend through rectangular apertures 44, in said members, and thereby provide an extreme extended position, or normal position for each of the support members.

Another characteristic of each of the records R''' is the region 46 of reduced thickness about its center hole. When these records are stacked on each other on the center post 17, a space 47 is present between adjacent records. Advantage of the space 47 is taken to insert supplementary record support members or separator members 48 and 49 to support those records of the stack above the bottom record thereof while the members 31 and 32 are retracted, by means to be described later, to allow the bottom record to drop to the support of the turntable.

Being of the width greater than the width of channel 38, the supplementary members or knives 48 and 49 are adapted to slide on the upper ends of the body portion. In so doing, they are guided by the parallel vertical walls 51 of a pair of pads 52 spaced slightly from the channel 38. As an additional means for providing support for a stack of records carried by the center post, the upper surfaces of the support members 31 and 32, at their outer ends, are relieved at 53 to provide surfaces on which the bottom record of the stack is adapted to rest at such an elevation that the blades 48 and 49 may be freely extended into that space 47 which is between the bottom record of the stack and the record immediately thereabove. The blades 48 and 49 are normally held in a retracted position by means later to be described. In this position similar arcuate ends 54 of the blades are retracted within the center post. In order that the blades may be extended, however, the blade 48 is provided with an aperture 56 through which one of the arms 34 extends while blade 49 is provided with an aperture 57 through which the other of the arms 34 extends. On the sides thereof remote from each other, the arms 34 are provided with sloping cam surfaces 58, each of which is adapted to cooperate with follower means provided by lugs 59 and 61 struck upwardly from the edges defining the apertures 56 and 57 respectively. As will be noted (Fig. 19), the lower portions of lugs 59 and 61 slope upward toward each other, in accordance with the sloping sides of cams 58, thence away from each other, thereby providing hooks 62, against which springs 63 (Fig. 16) are adapted to press to urge followers 59 and 61 of the blades against cam surfaces 58. Downwardly extending portions 64 of the springs 63 extend through holes 66 in the pads 52 to hold the springs in place thereon. A slight pressure by the springs 63 on the lugs 59 and 61 is maintained by the engagement of the springs with lugs 67 extending upward from the pads 52. The springs are additionally held in place by the cap 19, proximity of which to 'he lugs 67 prevents vertical displacement of the springs.

Due to the vertical movement of the bifurcated member 33, there is a considerable force tending to lift blades 48 and 49 from their supporting surfaces. This is resisted by proximity of a rib 73, on the cap 19, which extends into intimate association with the upper surface of the blade 49. A similar tendency on the part of the members 31 and 32 to be lifted from their support is resisted, in turn, by the blades 48 and 49.

Figures 12, 13, 14:
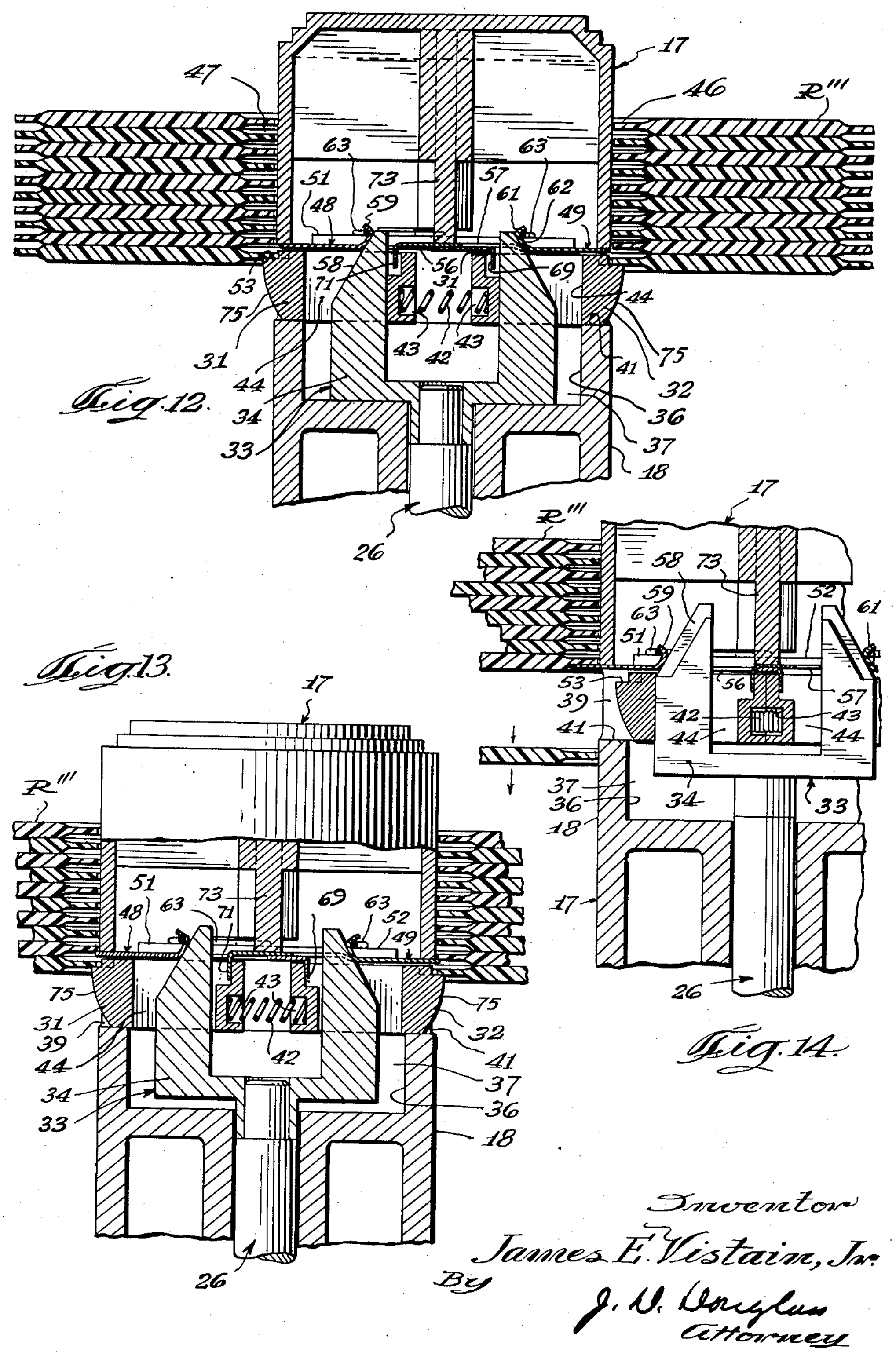
Fig. 12 is a fragmentary vertical section on line 12—12 of Fig. 10 showing the record support members in their normal position.
Fig. 13 is a fragmentary elevational view, partly in section, of the center post showing one pair of the record support members in an intermediate position.
Fig. 14 is another fragmentary view, corresponding to Figs. 12 and 13 showing both pairs of record support members in their extreme position.

The blades 48 and 49 are oppositely coupled to the record support members 31 and 32, i.e., blade 48 is coupled to members 32 and blade 49 to member 31 for the purpose of retracting members 31 and 32 when the blades are moved from their retracted positions (Fig. 12) to their extended positions (Fig. 14). In order that this manner of coupling may be effected, a portion of the blade 49 slides over blade 48, although the blade also slides on the end of body portion 17 due to an offset 68 transversely of blade 49. A finger 69, extending abruptly downwardly from one end of blade 48, is thus adapted to extend into the aperture 44 of member 32 between the arm 34 therein and the adjacent wall surface of said support member. A finger 71, on the inner end of blade 49 also extends downwardly through aperture 56 in blade 48, into aperture 44 in member 31 and between the remaining arm 34 and adjacent end wall of member 31. The cap 19, at its lower edge, is provided with diametrically opposite notches 74 (Fig. 15) adequate to freely accommodate the blades 48 and 49.

As will be noted (Fig. 12) the fingers 69 and 71 are normally in spaced relationship to the adjacent end walls of the members 31 and 32 owing to a region 72 of reduced thickness of each of these walls just above the pockets 43. There is, therefore, lost motion between fingers 69 and 71 and the members 31 and 32. The blades 48 and 49 are therefore adapted to be extended above the bottom record of the stack for support of the records thereabove before the record support members 31 and 32 begin to be retracted for release of said bottom record.

As they are released from the support of the magazine provided by the support members 31 and 32, the records R''', of course, accumulate on the turntable 3. In order that they may be readily removed therefrom and from the center post 17, the record support members 31 and 32 are each provided with surfaces 75 which slope in a curvilinear contour from their outer extremities downward and toward the axis of the center post to provide cam surfaces against which the records press as they are lifted upwardly. Very slight pressure of the records upward against surfaces 75 is necessary to cam members 31 and 32 to sufficiently retracted positions, against the resistance of spring 42, to enable the records to be moved past the support members.

The reciprocatory element 26 comprises a rod portion 76 (Fig. 15) to the upper end of which the bifurcated member 32 is rigidly attached. An adjustment pin 77 is threaded in the lower end of the portion 78. The length of the rod portion is thereby adjustable and the position at which it is adjusted may be maintained by a lock nut 72 on the pin, which is adapted to be clamped against the lower extremity of portion 76. This is in order that element 77 may cooperate with a suitable cam member 79 adapted to be moved horizontally and transversely of the axis of the element 26, and which will be described in detail hereinafter. As means to urge the element 76 downward to its normal position, a compression spring 81 is carried by rod portion 76 between a boss 82, internally of the body portion 18, and a U-washer 83 embracing said rod portion at an annular recess 84.

Figures 31, 32, 33, 34, 35, 36:
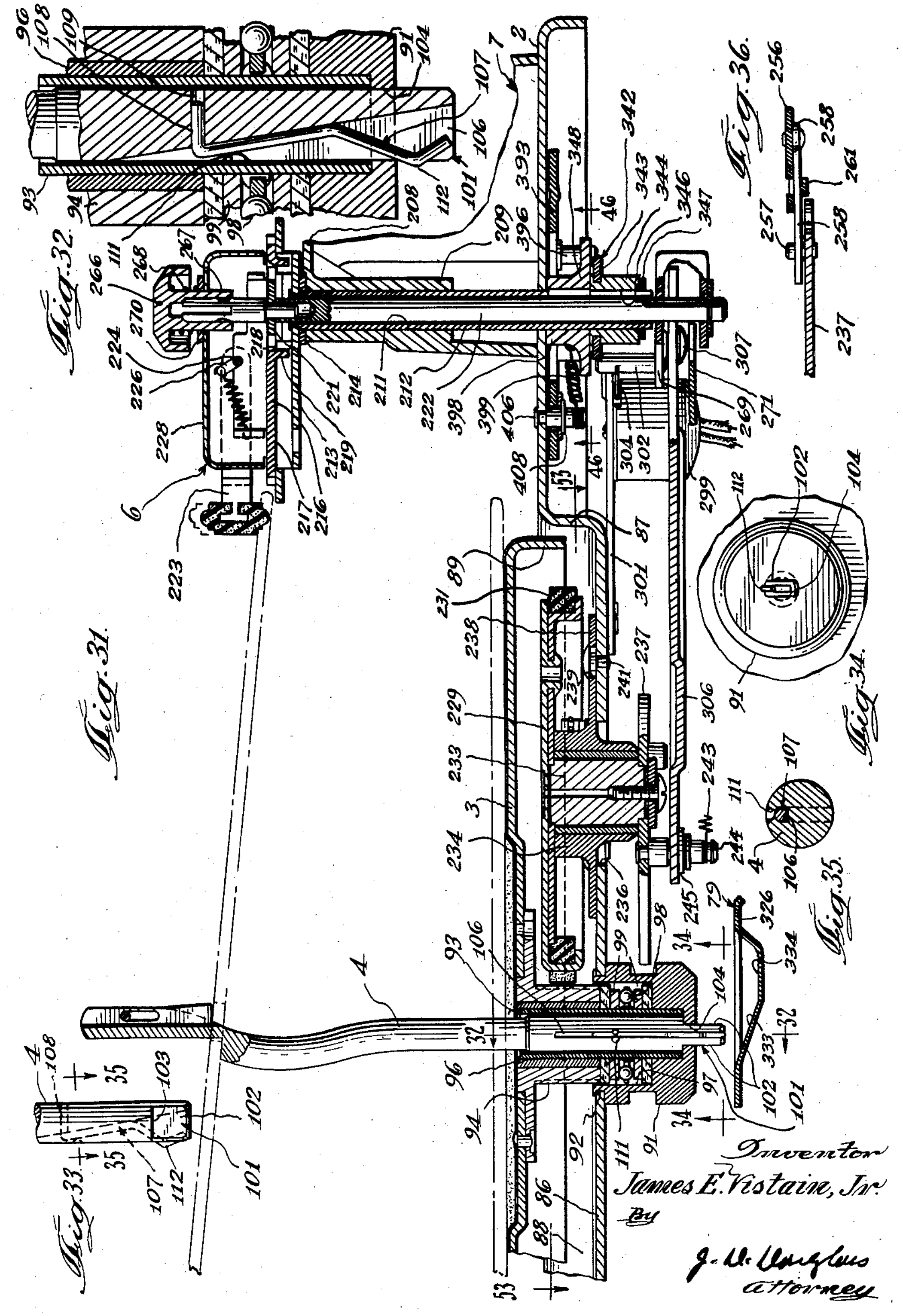
Fig. 31 is a fragmentary vertical section on line 31—31 of Fig. 30.
Fig. 32 is a fragmentary vertical section, drawn to an enlarged scale, taken on line 32—32 of Fig. 31, the swingable member having been omitted.
Fig. 33 is a fragmentary, vertical elevational view of one of the spindles.
Fig. 34 is a bottom plan view of the spindle socket and spindle therein as viewed from line 34—34 of Fig. 31.
Fig. 35 is a section, drawn to an enlarged scale, and taken transversely of the spindle on line 35—35 of Fig. 33.
Fig. 36 is a section on line 36—36 of Fig. 30.

The releasable support for the alternate spindles 4 and 11 respectively is best shown in Fig. 31. Therein it will be noted that the base plate 2 includes an offset wall 86 which is disposed at a level lower than the rest of the base plate by a circular wall 87 thereby providing a depression or well 88 adapted to accommodate the turntable 3, the latter having a depending flange 89 at its periphery. Centrally thereof, the wall 86 bears a socket member 91 which is suitably connected to the wall at an aperture 92 therein. Socket member 91 includes a vertically extending sleeve 93 on which the turntable 3 is journalled by a hub 94 extending downwardly therefrom and within which is a bushing 96 for rotatable engagement with the sleeve 93. The socket member 91 is further provided with a recess 97 in which is accommodated a ball thrust bearing 98, sandwiched between anti-vibration washers 99 to support the weight of the turntable.

As will be noted (Figs. 31 and 33) the spindle 4 is provided, at the base thereof, with a tongue 101 in part defined by opposed flat surfaces 102 and shoulders 103 provided by the flat surfaces. The tongue 101 is adapted to extend through an aperture 104, of formation similar to the cross section of tongue 101, in the base of socket member 91, the spindle 4 being secured against turning movement. As a means to secure spindle 4 releasably in the position indicated, said spindle is provided with a slot 106 (Fig. 32) which tapers, in depth, from the periphery thereof to the extremity of the tongue 101. The slot 106 is adapted to house a deflection spring 107 which includes an arm 108 by which the spring is anchored to the base of the slot by its extension into a hole 109, transversely of the spindle. Portions 101 (Fig. 35) staked over the edge of the slot serve to prevent displacement of the arm from the hole. As the spindle 4 is pressed into the sleeve 93, a knee 112, which normally is in extension from the slot, is pressed within the slot until said knee is carried to a point below the bottom of the socket member 91, where its outward extension serves to minimize or obviate lateral play of the spindle and releasably resist its removal from the socket member 91.

The structure of the base of spindle 11 is identical with the corresponding part of spindle 4.

*Motor drive*

Figures 58, 59:
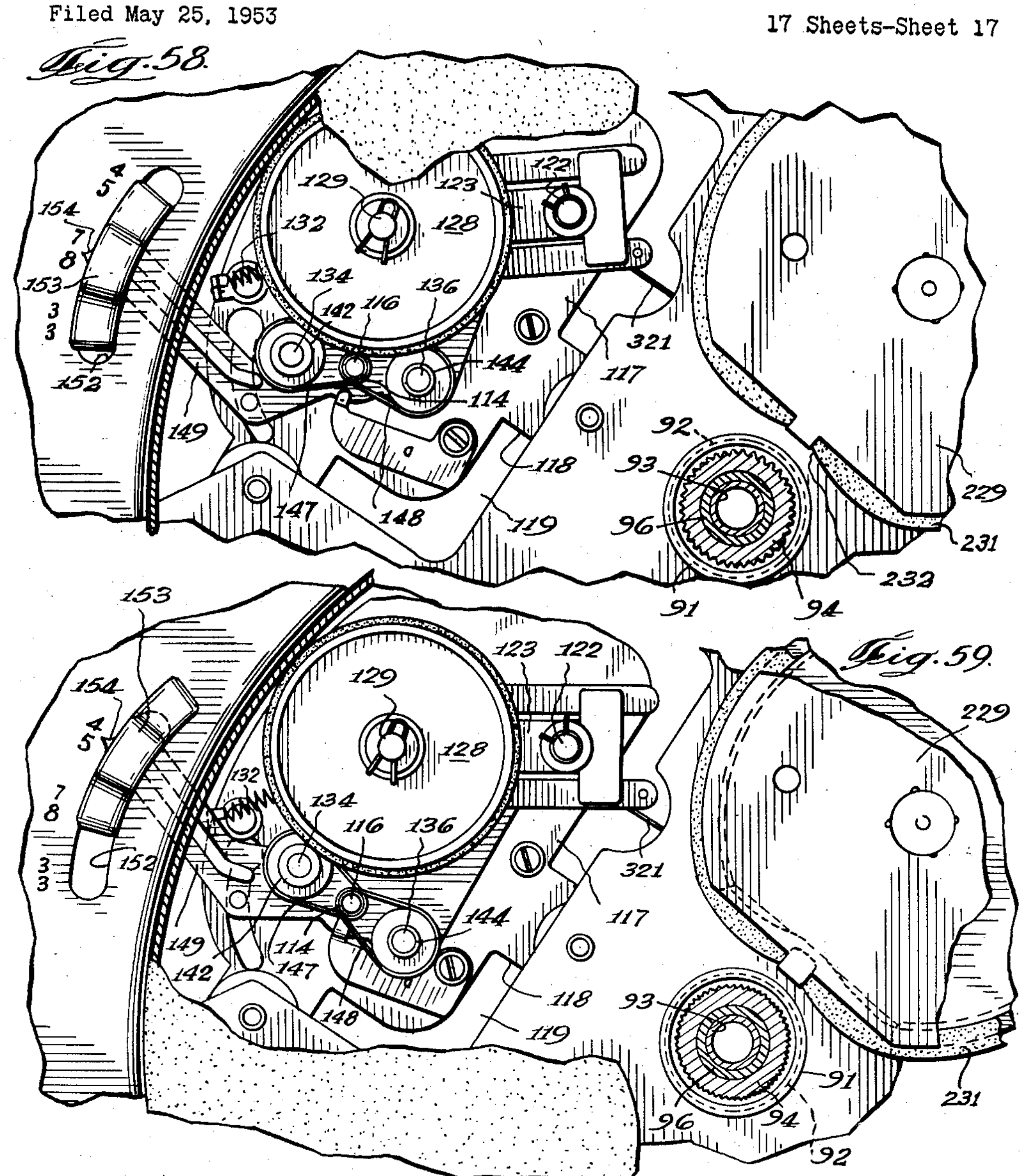
Fig. 58 is another view corresponding to Fig. 55, the motive unit being shown as adjusted for operation of the turntable at a different speed.
Fig. 59 is another view corresponding to Fig. 55, the motive unit being shown as adjusted for operation of the turntable at still another speed.

Means for driving the turntable 3 includes a motive unit 110 (Figs. 54 to 56 inclusive) which forms no part of the present invention. However, it is timely to say that the motive unit comprises a motor 113 which has an armature shaft 116 on which is carried a pulley 114. The motor 113 is conveniently supported from a frame 117. The legs 118 of the frame are bolted to the offset base portion 86 below an aperture 119, grommets 121 between the legs and portion 86 also being employed to isolate vibration of the motor from other parts of the record player. The plate 117 carries a fixed pin 122 about which is adapted to swing a carrier 123 having a pair of fingers 124 at each of its four corners between which two arms 126 of a bifurcated member 127 are slidably accommodated. A mobile, rubber tired idler 128 is rotatably supported from the bifurcated member 127 by a pin 129 thereon and biased into concurrent driving relationship with both motor pulley 114 and a depending flange 81, at the periphery of the turntable, by a tension spring 132 anchored between member 127 and the plate 117. The driving relationship from the motor 113 to the turntable, as just outlined, provides for operation of the turntable at a speed of 78.26 revolutions per minute only as when the records R and R′ are reproduced (Fig. 58).

To change the rotational speed of the turntable, a control plate 133 (Fig. 56) is provided. It carries studs 134 and 136 on opposite sides of the motor shaft 116 about which plate 133 may be manually swung in an arc limited by an arcuate slot 137, in plate 133, and a pin 138, on the frame 11, which extends into said slot. Journalled on the stud 134 is an idler 139 having steps 141 and 142 while similarly mounted on stud 136 is an idler 143 having steps 144 and 146. Steps 141 and 146 are of similar diameter, and are coupled to motor shaft 116 by belts 147 and 148, rotating at the same speed. The diameters of the steps 142, 144 and pulley 114, however, all differ in diameter.

Plate 133 is controlled by an arm 149, extending laterally therefrom, from the free end of which is supported a stud 151, in extension through an arcuate slot 152 in base plate 2. The stud 151 is surmounted by a handle 153, above the base 2, by which plate 133 and consequently idlers 139 and 143 are adapted to be swung alternately to and away from the floating idler 128.

As will be noted, plate 2 bears indicia "33," "78" and "45" beside the slot 152. When arm 149 is swung to a point whereat a pointer 154, on handle 153 (Fig. 55) is opposite indicia "33," the step 144 is carried into engagement with follower 128, sufficient force being thereby applied to follower 128 to move it out of engagement with pulley 114. This provides for operation of the turntable at a speed of 33⅓ revolutions per minute, since step 144 is of diameter to provide for this. When arm 149 is swung to where pointer 154 is adjacent indicia "78," step 144 is out of engagement with follower 128 thus enabling spring 132 to move the follower into driving engagement with the motor pulley 114. When arm 149 is swung still farther so that pointer 154 is at indicia "45" (Fig. 59) step 142 of idler 139 engages floating idler 128 and moves it out of engagement with the motor pulley 114. Driving engagement between idler 128 and step 142, which is of appropriate size, provides for operation of the turntable at a speed of 45 revolutions per minute.

For releasably retaining the plate 133 in any one of the foregoing three positions, said plate is provided with a series of three holes 156 (Figs. 56 and 57) arcuate of the motor shaft 116. Below the arc of the holes 156 a ball 157, of diameter greater than the holes 156, is confined in a hole 158 between a leaf spring 159, on plate 117, and plate 133 so that at each of the positions alluded to ball 157 is pressed into one of the holes to resist lateral displacement of plate 133.

*Pickup arm*

As has previously been indicated, the pickup arm 8 (Fig. 52) is supported from the bearing member 7. To provide this support the bearing member is substantially semicircular in transverse cross-section. It is preferably constructed of some rigid plastic material such as Bakelite and is rigidly coupled to base plate 2 in any convenient manner.

Figures 23, 24, 25, 26:
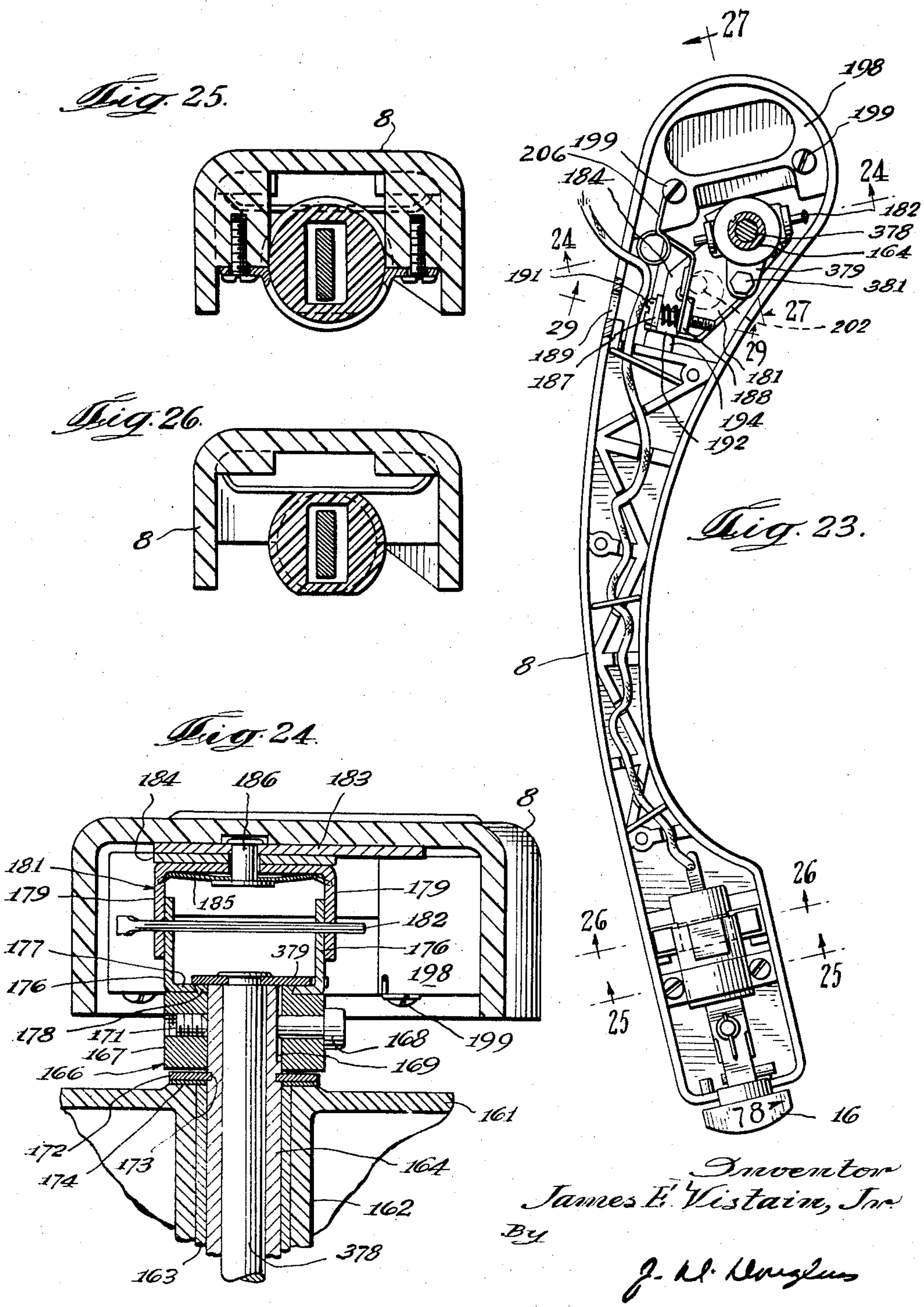
Fig. 23 is a bottom plan view of the pickup arm.
Fig. 24 is a vertical section on line 24—24 of Fig. 23.
Fig. 25 is a vertical section on line 25—25 of Fig. 23.
Fig. 26 is a vertical section on line 26—26 of Fig. 23.

The member 7 includes a horizontal top wall 161 from which a boss 162 extends downwardly through an opening 160, in the base plate. This boss carries a tubular insert or bushing 163, in rigid association therewith, within which a tubular shaft 164 is journalled. Upwardly thereof, shaft 164 carries a tone arm support member 166 which includes a collar 167 (Fig. 24). Driving relationship between the collar 167 and shaft 164 is provided by a pin 168 carried by the collar 167. The inner end of pin 168 is received by a keyway 169, extending downwardly from the upper end of shaft 164, to secure the collar against rotation with respect to the shaft while a set screw 171 threaded in the collar is adapted to lock the collar on the shaft after it has been slid to a desired position. The shaft 164 is further restrained against downward displacement with respect to the bushing 163 by a U-shaped washer 172 which, by virtue of its resiliency, is adapted to pinch the shaft 164 at an annular groove 173 thereon. If desired, a spring washer 174, normally arcuate in transverse section, may be used on the shaft 164 between the bushing 163 and U-shaped washer 172 to cushion the support for the pickup arm.

The member 166 includes bifurcated support means provided by a pair of spaced-apart arms 176 extending upwardly from the collar 167, the arms preferably being integral with a base 177. A section 178, of reduced diameter, of the collar 167 extends through base 177 with which it is in rigid association. The arms 176 are embraced by a pair of downwardly extending arms 179 of a second or upper bifurcated member 181 while a pin 182 passing through arms 176 and 177 serves to couple the arms together and provide a horizontal axis about which pickup arm 8 may rock.

Figures 27, 28, 29:
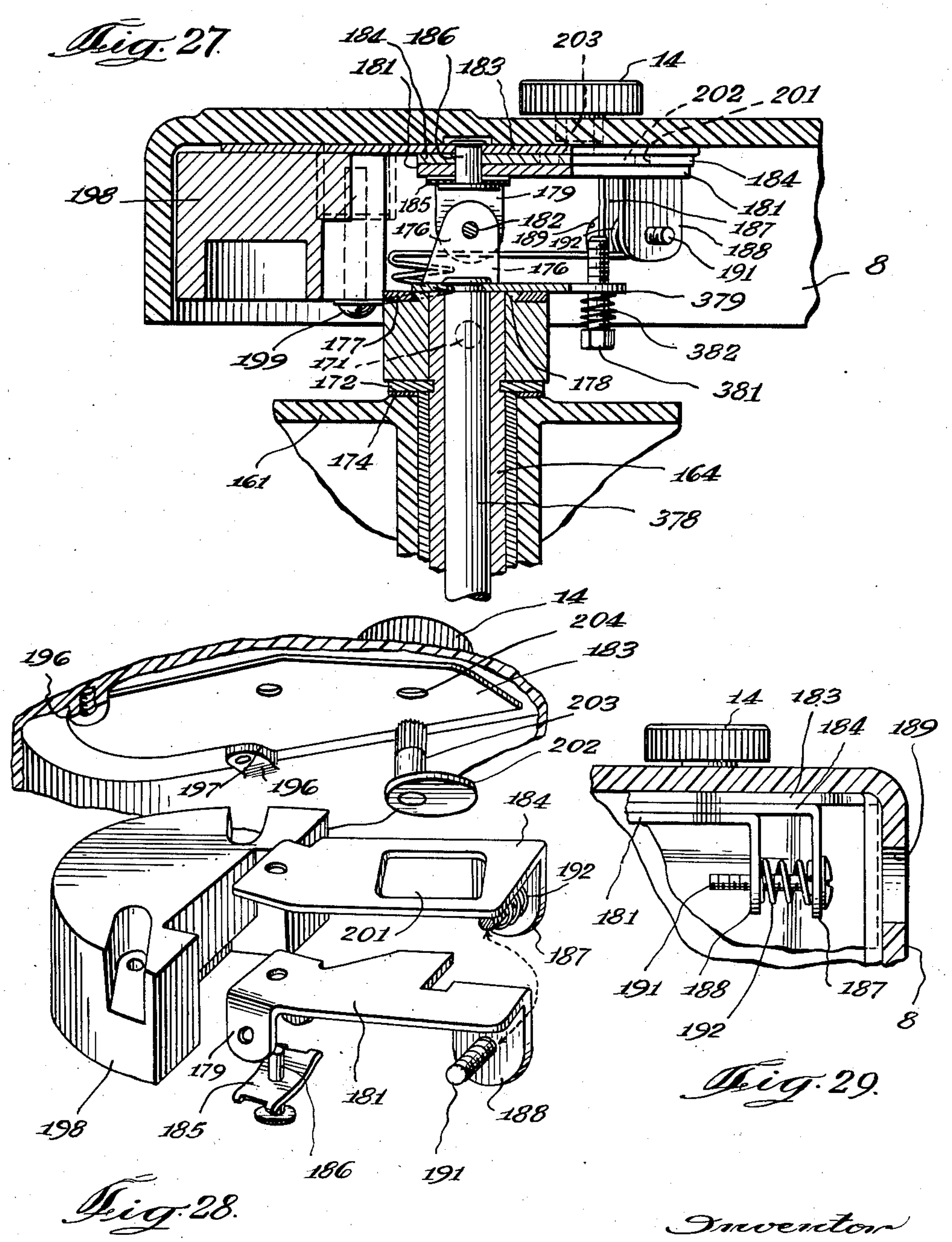
Fig. 27 is a vertical section on line 27—27 of Fig. 23, the pickup arm being partly supported by an accumulation of records.
Fig. 28 is an exploded view of elements of the pickup arm mounting, in perspective.
Fig. 29 is a fragmentary vertical section on line 29—29 of Fig. 23.

The pickup arm 8 is adapted to be adjusted laterally to a minute degree with respect to the upper bifurcated member 181. The adjustment to provide for this is a precautionary measure to assure accuracy of initial engagement of the beginning of the sound groove of a record on the turntable 3, by the pickup arm. Mechanism by which the adjustment is carried out includes a carrier element 183 (Fig. 27) rigidly attached, by means later to be described, to the pickup arm internally of the top thereof, and an intermediate member or follower member 184 between the carrier member and the upper bifurcated member 181. The carrier member 183 and intermediate member 184 are pivoted to the upper bifurcated member 181 by a rivet 186 passing through these members. If desired, the rivet 186 may press a leaf spring 185 against the bifurcated member 181 to maintain intimate association of the parts if rivet 186 alone is insufficient to hold them tightly but movably together. The follower member 184 is of elongated formation and bears, laterally of one end thereof a finger 187 extending downwardly beside a similar finger 188 extending downwardly from one end of the upper bifurcated member 181. The pickup arm 8 has an aperture 189 (Fig. 29), laterally thereof, adjacent finger 187, through which a screw driver may be passed to turn a screw 191, threaded in the finger 188 and passing loosely through finger 187. The screw 191 is thus adapted to swing the pickup arm 8 in one direction about its pivotal support while a compression spring 192 coiled about screw 191 is adapted to swing the pickup arm in the opposite direction as pressure on the spring provided by the screw is lessened. The carrier member 183 is retained against longitudinal and lateral displacement thereof by a pad 194 (Fig. 23) internally of the top of the pickup arm and also by pads 196 (Fig. 28). One end of the carrier member 183 is in intimate association with pad 194 while shoulders 197, on member 183 are pressed against the pads 196. Additionally, the carrier member 183 is clamped between the top of the pickup arm and a counterweight 198 by a pair of screws 199 passing through the counterweight and threaded in the pads 196.

Although, as will later be shown, the pickup arm 8 is adapted to be swung automatically by pickup arm manipulating mechanism to but two "let-down" points, one for 10-inch and one for 12-inch records. Mechanism in connection with the pickup arm is also provided by which said arm may be swung manually through a predetermined arc with respect to the intermediate member 184 so that once the pickup arm has been swung through said arc, the pickup arm manipulating mechanism is adapted to lower the pickup arm into initial engagement with the beginning of the sound groove of a 7-inch record of the R″ or the R‴ variety. Accordingly, the follower member 184 has an aperture 201 in which is received a came or eccentric 202 which is carried by a stub shaft 203 in turn journalled in a hole 204 in the carrier element 183. The shaft 203 extends through the upper wall of the pickup arm and is surmounted by the handle 14 (Fig. 8). Turning handle 14 is accompanied by rotation of cam 202 and thereby the carrier element 183 is swung about the pivot 186. As a factor for overcoming the effect of possible lost motion between the cam 202 and sides of aperture 201, a deflection spring 206 is anchored, by one of the screws 199, to the weight 198. The spring 206 is adapted to extend between arms 187 and 188 and by pressing against arm 188 biases one of the sides of aperture 201 into constant engagement with eccentric 202.

The adjustment of cam 202 is preferably indicated by suitable indicia externally of the pickup arm 8. This may appropriately take the form of a dot or pointer 207 (Fig. 8), on the pickup arm, and, on the top of handle 14 a notation "7" and diametrically opposite thereto a notation "10.12." One of the steps necessary to put the record player in readiness for automatically changing and playing 7-inch records is, therefore, to turn handle 14 until "7" thereon is beside the pointer 207. For automatic operation with 10-inch records and 12-inch records, handle 14 is turned until "10.12" is opposite the pointer 207.

*Ejector head*

Figures 52, 53, 54:
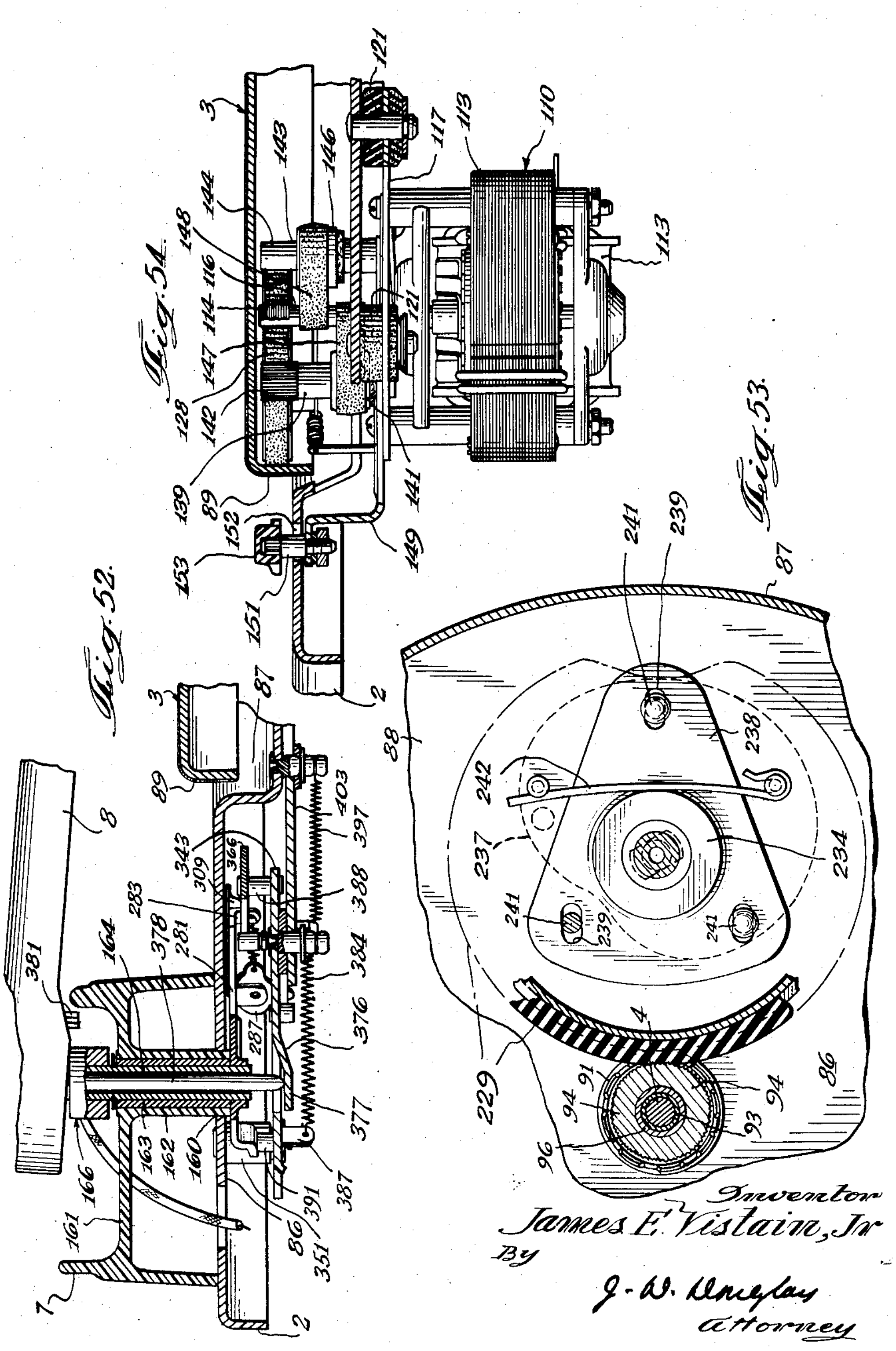
Fig. 52 is a sectional view, partly in elevation, corresponding to Fig. 27.
Fig. 53 is a fragmentary horizontal section taken on line 53—53 of Fig. 31, the friction wheel having been rotated through a half turn from the Fig. 31 position.
Fig. 54 is an elevational view of the motive unit showing adjacent parts in fragmentary vertical section.

The ejector head 6 is also supported from the bearing member 7 (Fig. 31) and is identical with the ejector head whose structure is set forth in my copending application filed on October 21, 1948, Ser. No. 55,801. For the purpose of this application, it is timely to state that the member 7 includes a horizontal wall 208 disposed at a level higher than the wall 161 (Fig. 52). From the wall 208 (Fig. 31) a boss 209 extends downwardly and is formed with a bore 211 in which a sleeve 212 is journalled. The ejector head 6 includes a horizontal support plate 213 which is rectangular in general formation, rigidly coupled to the sleeve 212 and also preferably spaced from the top wall 208 by a bearing washer 214. Furthermore, the sleeve 212 is attached to the plate 213 at a point nearer to one end thereof than the other by a difference adequate to compensate for the difference between the radius of a 10-inch and a 12-inch record so that regardless of which sized record is threaded over the spindle 4, the support plate provides support for that record at its peripheral edge when turned with the appropriate end of the support plate toward the spindle. A push plate 216 is slidably anchored to the support plate by means to be described hereinafter. Horizontal bearing surfaces 217 extend along either side of plate 213, the bearing surfaces being offset from the central regions of the plate. The push plate 216 is also of generally rectangular formation In order that the push plate 216 may be oscillated with respect to the support plate 213, said push plate is provided with an aperture 218 eccentrically of the ends thereof. From opposite sides of the aperture 218, and transversely of the course that the push plate is moved through, a pair of flanges 219 extend downwardly. The flanges 219 are spaced apart by a distance equal to the diameter of an eccentric member 221 rigidly carried by a composite crank rod 222 which is journalled in and slidable axially the sleeve 212. The eccentric member 221 being supported between the flanges 219, is therefore adapted to to move the push plate 216 longitudinally of the plate 213 whenever the rod 222 is rotated.

As will be noted (Fig. 31), the push plate 216 is materially shorter than the support plate 213 so as to provide space above the corners of plate 213 for a stack of records. Owing to this formation of plate 216, the periphery of the bottommost record of a stack is adapted to be engaged by one of the ends of said push plate to dislodge the bottom record from the magazine without disturbing the remaining records of the stack.

Hold-down means are provided to press the records against the support plate 213 as a safeguard against tilting of the records about their support on the spindle 4 and consequent failure of release from the magazine. For this precaution, a substantially U-shaped member of hold-down arm 223 is fixed to a horizontal shaft 224 which is in pivotal relationship to plate 213. The shaft 224 includes a crank-portion 226 to which a tension spring 227 is anchored to bias the hold-down arm against a record or records supported by either end of the support plate 213. Mechanism of the ejector head 7 is largely obscured from view by a cover 228.

*Cam and trigger mechanism*

Clutch means is provided between the driven turntable and mechanism adapted to be intermittently driven through a cycle of operation from the turntable to manipulate the pickup arm and sequentially operate the ejector mechanism when a record is to be changed. In greater detail, the hub 94 (Fig. 31) is adapted to engage a mutilated friction wheel or pulley indicated in its entirety by the reference character 229. For this operation the surface of the hub 94 is preferably knurled while the wheel 229 is provided with a rubber tire 231. For operative association of the wheel 229 with the hub, said wheel is supported indirectly from the offset wall 86 of the base plate 2 by mechanism later to be described.

The structure of the wheel 229, and its support by the base plate has already been set forth in my copending application filed on October 21, 1948, Ser. No. 55,801. It is noteworthy, however, that uniformity of the peripheral region of wheel 229 is broken by a notch 232 (Fig. 58). Consequently, when driving engagement of the wheel 229 and hub 94 is established, it continues only until the notch 232 is adjacent hub 94 at which time the hub is in spaced relationship to the wheel 229 and driving engagement ceases.

The wheel 229 is rigidly supported on the upper end of a stub shaft 233 which is journalled in a bearing 234 against the upper end of which the wheel is adapted to rest. The bearing 234 also extends downwardly through an aperture 236 in the offset wall 86. On its lower end shaft 233 bears a rotary cam 237, in fixed relationship thereto.

The wheel 229 is movably anchored to the offset wall 86. To provide for this, the bearing 234 includes a laterally extending flange 238 (Fig. 53) which is generally triangular in formation. Each of the corners of the flange 238 has a slot 239 in which is received a headed pin 241 extending upwardly from the wall 86. The wheel 229 is thus movable toward and away from the hub 94 to an extent limited by the slots 239 and pins 241. A resilient wire or rod 242, conveniently anchored to the wall 86 extends over the flange 238 and by pressing against the bearing 234 cushions the driving communication between the wheel 229 and hub 94.

Figure 30:
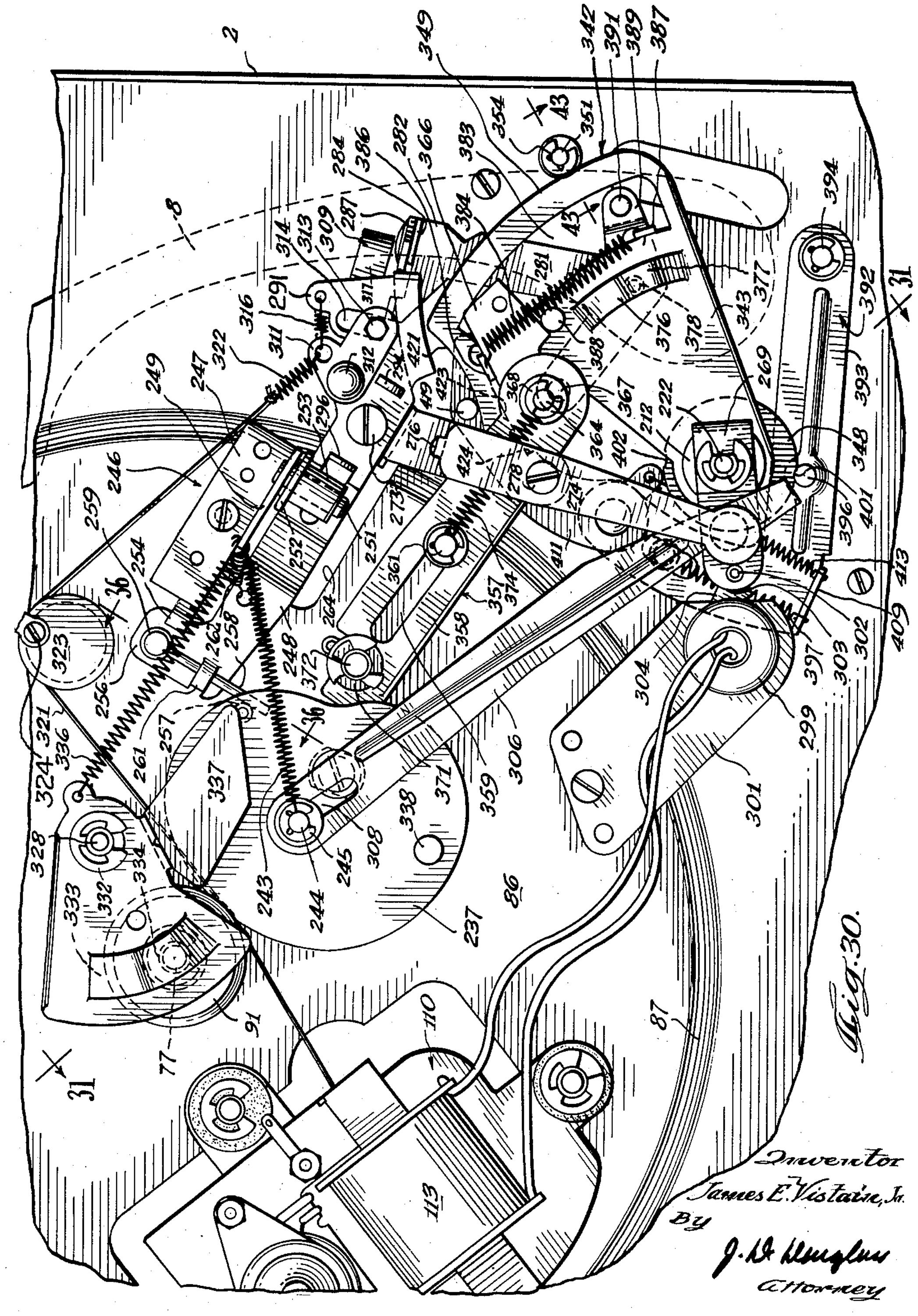
Fig. 30 is fragmentary bottom plan view of the improved record player, the parts thereof being in the positions they occupy while a record is being reproduced.
Figure 60:
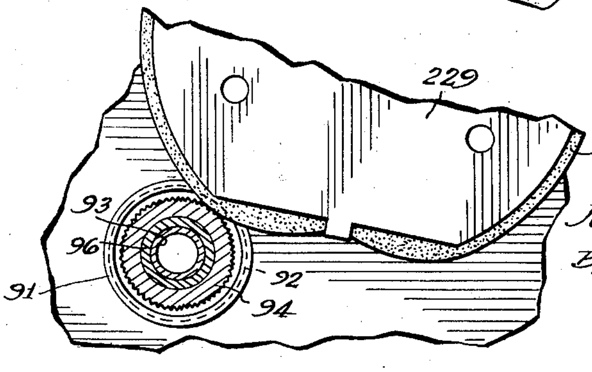
Fig. 60 is a view corresponding to Fig. 53, the parts being indicated as they are at the beginning of a record changing cycle.

From the position occupied by the wheel 229 while a record is being played (Fig. 58) the wheel is normally urged counter-clockwise. The concurrent position of cam 237, as viewed from below the level of the record player, is indicated in Fig. 30 wherein the cam is biased in a clockwise direction. This is effected by a tension spring 243 anchored to the cam 237 by a crank pin 244 carried by said cam and eccentric to the axis thereof. But this urge to rotate is resisted by mechanism, to be later described, and which retains the wheel positioned with the notch 232 adjacent the hug 94. However, when a record is rejected the mechanism, last referred to, releases the wheel and the spring 243 turns the cam and the wheel 229 about its axis sufficiently for the peripheral surface of the wheel to be swung into driving communication with the hub 94 (Fig. 60).

Rotation of the cam 237 to turn the wheel 229 into driving engagement with the hub 94 is delayed by a trigger mechanism referred to in its entirety by the character 246 (Fig. 30). Said mechanism includes a bracket member 247, rigidly secured to the offset wall 86, and pivotally supports a latch or lever 248. The bracket member 247 has and arm 249 extending downward and which supports a horizontal stud 251. The pivoted member 248 also includes an arm 252 extending downward and carries a bushing 253 which is journalled on the stud 251. At one end thereof the bracket 247 is offset at 254 from the wall 86 to provide, therewith, limits between which the lever 248 is adapted to swing, said lever having an arm portion 256 extending between the offset portion 254, of the bracket, and wall 86. In order that the lever 248 may obstruct rotation of the wheel 229 and maintain the notch 232 adjacent the hub 94 while playing a record, the cam 237 is provided with a pin 257 (Fig. 30) extending vertically from its upper surfaces, which pin is adapted to engage a finger 258 on the lever 248. Preferably, the finger 258 may take the form of a wire or rod twisted about a rivet 259 and caught beneath a hook 261 struck from the lever 248. The lever 248 and its finger 258 are biased toward the cam 237 by any suitable means such as a tension spring 262 anchored between the lever 248 and the arm 249. When the lever 248 is rocked about the stud 251 against the resistance of spring 262, the finger 258 is rocked upwardly and out of engagement with pin 257. Thereupon, spring 243 moves the cam and with it the notch 232 in the friction wheel to provide driving relationship between the wheel 229 and the hub 94. The cam 237 is then driven substantially through a complete revolution before the completion of which lever 248 is returned to its former and normal position by the spring 262 so that the rotation of cam 237 is adapted to be arrested by engagement of the pin 257 by the finger 258, a cycle of operation of the cam then having been completed.

As will be noted (Fig. 49), the elever 248 is provided with an offset at 263. This is for a purpose to be apparent hereinafter. To accommodate this offset portion, the wall 86 is provided with an aperture 264.

Motion is adapted to be imparted manually to the lever 248 from a point above the ejector head 6. This is carried out by a button or handle 266 (Fig. 31) carried on the upper end of the rod 222. The button 266 includes a hub 267 around which a compression spring 268 is coiled between the cover 228 and the button, a washer 270 between the spring and cover also being preferably employed. The spring 268 thus biases rod 222 upwardly while a crank arm 269, rigidly coupled to the lower end of rod 222, limits upward movement of the same by engagement with sleeve 212. A substantially Z-shaped arm 271 is fixed to the trigger lever 248, preferably by spot welding. This arm extends in a direction away from the arm 249 and bears an adjustable arm 274 which has at one end thereof a hook shaped lug 276, of reduced width, in extension through an aperture 277 in the arm 271. A screw 278 is threaded into arm 271 adjacent one end and also passes loosely through arm 274. The free end of arm 274 extends beneath the crank arm 269 the proximity to which is regulated by means of the screw 278 and a resilient washer 279 around said screw and between the arms 271 and 274, the washer being arcuate in transverse cross section. It will now be apparent that downward movement of the crank arm 269 rocks lever 248 thereby freeing cam 237 from the holding operation of finger 258 so that the cam may be swung by spring 243 until driving relationship between the turntable hub 94 and wheel 229 is established and thereby the cam rotated through a cycle. When pressure in a downward direction is removed from the handle 266, the spring 268 immediately raises the crank rod 222 upwardly to its normal position; also, the spring 262 simultaneously returns finger 258 to its normal position wherein it is adapted to obstruct rotation of cam 237 when pin 257 is carried to the finger 258.

Figures 49, 50, 51:
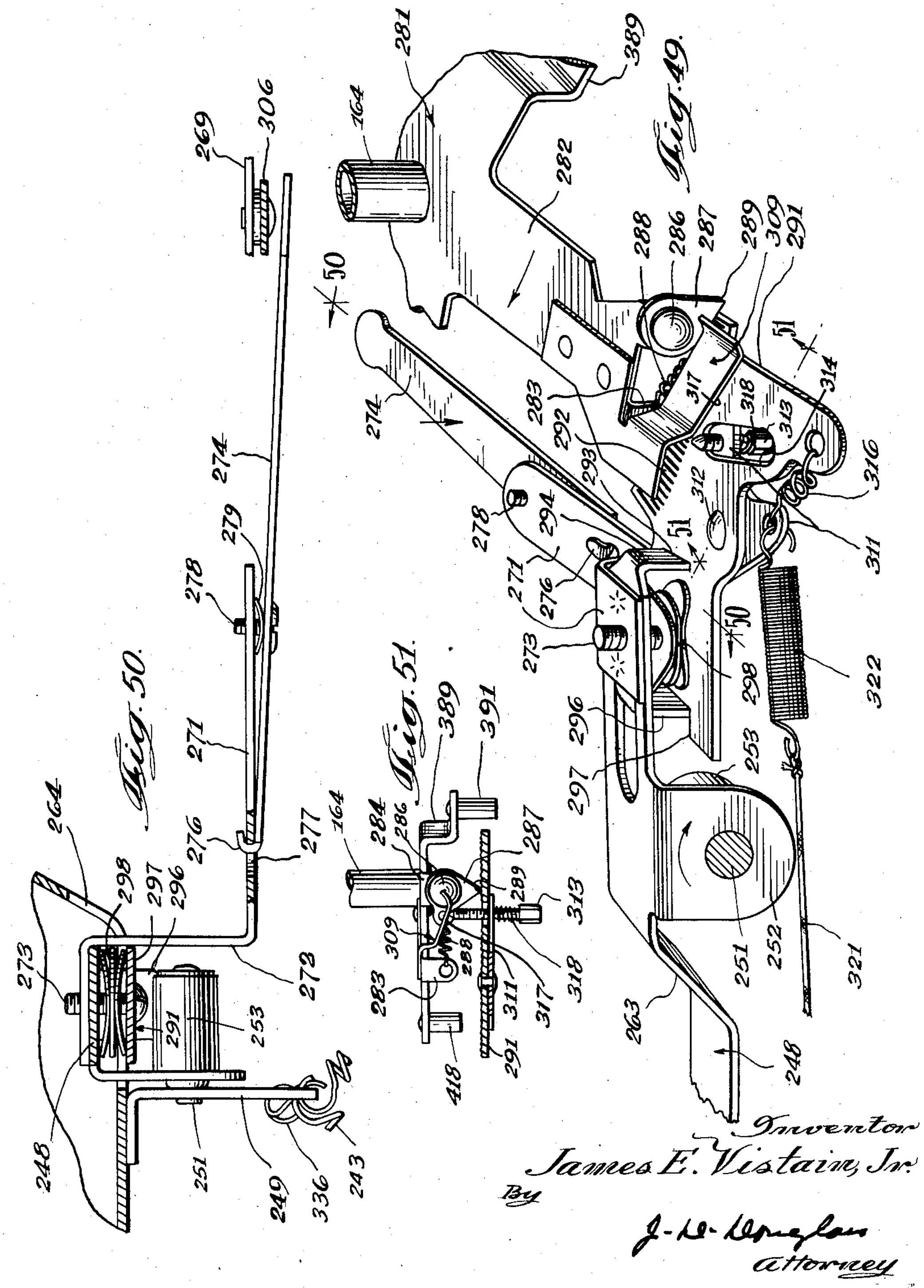
Fig. 49 is a fragmentary perspective view of elements of the trigger mechanism and spider mechanism.
Fig. 50 is a view, partly in elevation and partly in vertical section, taken on line 50—50 of Fig. 49.
Fig. 51 is another view, partly in elevation and partly in vertical section, taken on line 51—51 of Fig. 49.

Means are also provided to rock the lever 248 automatically. This is effected when the pickup arm 6 reaches the eccentric groove or the spiral terminal groove at the end of the sound groove of a record. The means alluded to comprise a spider 281 (Fig. 45) rigidly attached to the shaft 164, and consequently adapted to swing horizontally with the pickup arm. The spider 281 includes a pawl arm 282 (Figs. 41 and 51) having at the swinging end thereof a pair of fingers 283 and 284 extending downwardly. Pivoted to the finger 284, by a rivet 286, is a pawl 287. A tension spring 288, anchored to the finger 283 and pawl, normally retains a point or edge 289 of the pawl in a downward position; that is, in a position where the edge 289 is directly below the axis of the rivet 286 (Figs. 49 and 51). As the stylus of the pickup arm 6 enters the eccentric groove of a record of the R, R′ or R″ type on the turntable 3, the pawl 287 engages a ratchet plate 291, carried by the pivoted member 248, and having a series of ratchet teeth 292 disposed substantially radially of the tubular shaft 164. The plate 291 is carried at such a level with respect to the pawl 287, when the lever 248 is in its normal position, that initial engagement of the pawl 287 by the plate 291 is adequate to swing the pawl about its axis against the resistance of spring 288 from its normal position (Fig. 51) to the position indicated in Fig. 49 as the pickup arm is moved inwardly by the eccentric groove on the record just reproduced. The eccentric groove then swings the pickup arm outwardly which is accompanied by movement of the pawl arm 282 in the opposite direction. But the edge 289 of the pawl being adapted to be caught by the teeth 292 of the ratchet, said ratchet receives a downward force from the pawl which is adequate to rock the lever 248 about its pivotal axis and disengage finger 258 from the pin 257 thereby giving rise to a cycle of operation of cam 237. As soon as the cycle just referred to has been initiated, the pawl is swung out of engagement with the ratchet by mechanism to be described hereinafter.

Provision is made for adjusting the position of the plate 291 vertically so that it is adapted to be engaged by the pawl 287. To this end, the plate 291 is provided with a slot or aperture 293 only large enough and of formation to accommodate a lug 294 struck downwardly from the end of lever 248; also a second lug 296 struck downwardly from the lever 248, is received within a notch 297 at one end of the plate 291. The plate 291 is thus adapted to be guided by the lugs which secure it against edgewise displacement. A screw 273 passes through plate 291, between the lugs, through the lever 248 and arm 271 in which it is threaded. The plate 291 is thus adapted to be drawn toward lever 248 by rotation of the screw, but is yieldably resisted by resilient means which may appropriately take the form of one or more spring washers 298 on the screws 273 between plate 291 and the pivotal member 248.

Figures 37, 38, 39, 40:
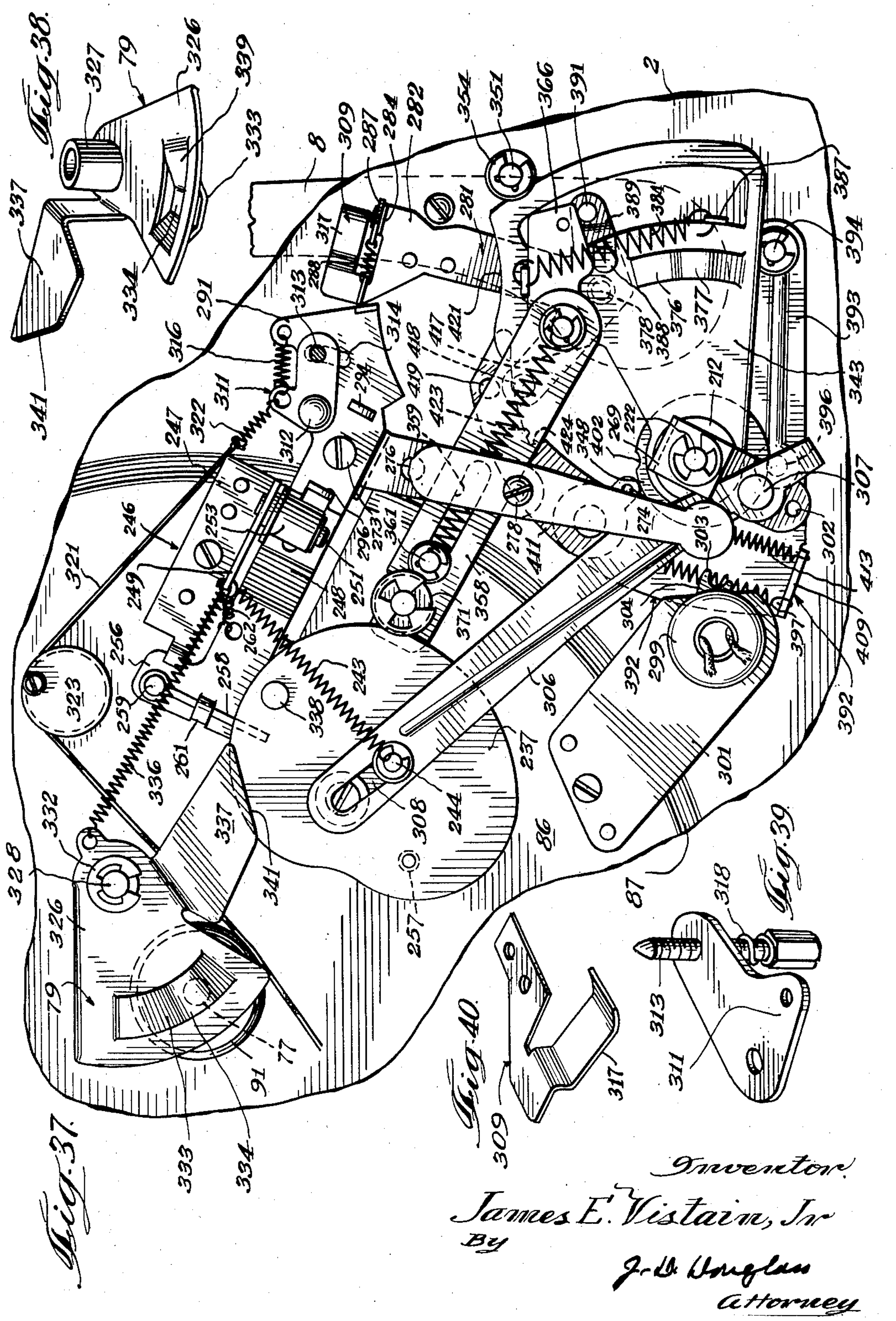
Fig. 37 is a fragmentary bottom plan view corresponding to Fig. 30, parts being in the position they occupy during a record changing cycle.
Fig. 38 is a view of the mechanism, in perspective, for operating the center post.
Fig. 39 is a view of elements, in perspective, of the mechanism adapted to initiate a record changing cycle.
Fig. 40 is a perspective view of the cam member which is adapted to cooperate with the mechanism of Fig. 39.

Alternate means to rock trigger lever 248 and thereby initiate cyclic operation of the cam 238 is provided. The alternate means is essential when a stack of records R''' are automatically reproduced since their terminal grooves being of the spiral type, rather than the eccentric type, are not adapted to move the arm 282 in an oscillatory manner. Accordingly, a position stop or trip mechanism is employed which comprises a cam bracket 309 (Figs. 40 and 49), rigidly connected to the arm 282, and a follower lever 311, pivotally coupled to the ratchet plate 291 by a rivet 312. Through one end of lever 311 a follower screw 313 is threaded and extends upwardly through a slot 314 in the ratchet plate 291. The lever 311 is biased in a clockwise direction about rivet 312 by a tension spring 316. It is adapted to maintain screw 313 normally at the end of slot 314 as indicated in Fig. 30. In this position, the screw 313 is adapted to be intercepted by a cam surface 317, on bracket 309, as it is carried through its arc by inward motion of the pickup arm when tracking one of the records R'''. The upper end of screw 313 (Fig. 51) is so adjusted with respect to the level of cam surface 317 that when the pickup arm is carried inwardly by the spiral terminal groove of one of the records, the screw is depressed by the cam thereby rocking the trigger lever 248 to initiate operation of the cam 237. If desired, a compression spring 318 may be coiled about screw 313 and adjustment thereof made against the resistance of said spring as a means for maintaining the adjustment of the screw.

Figures 41, 42, 43, 44:
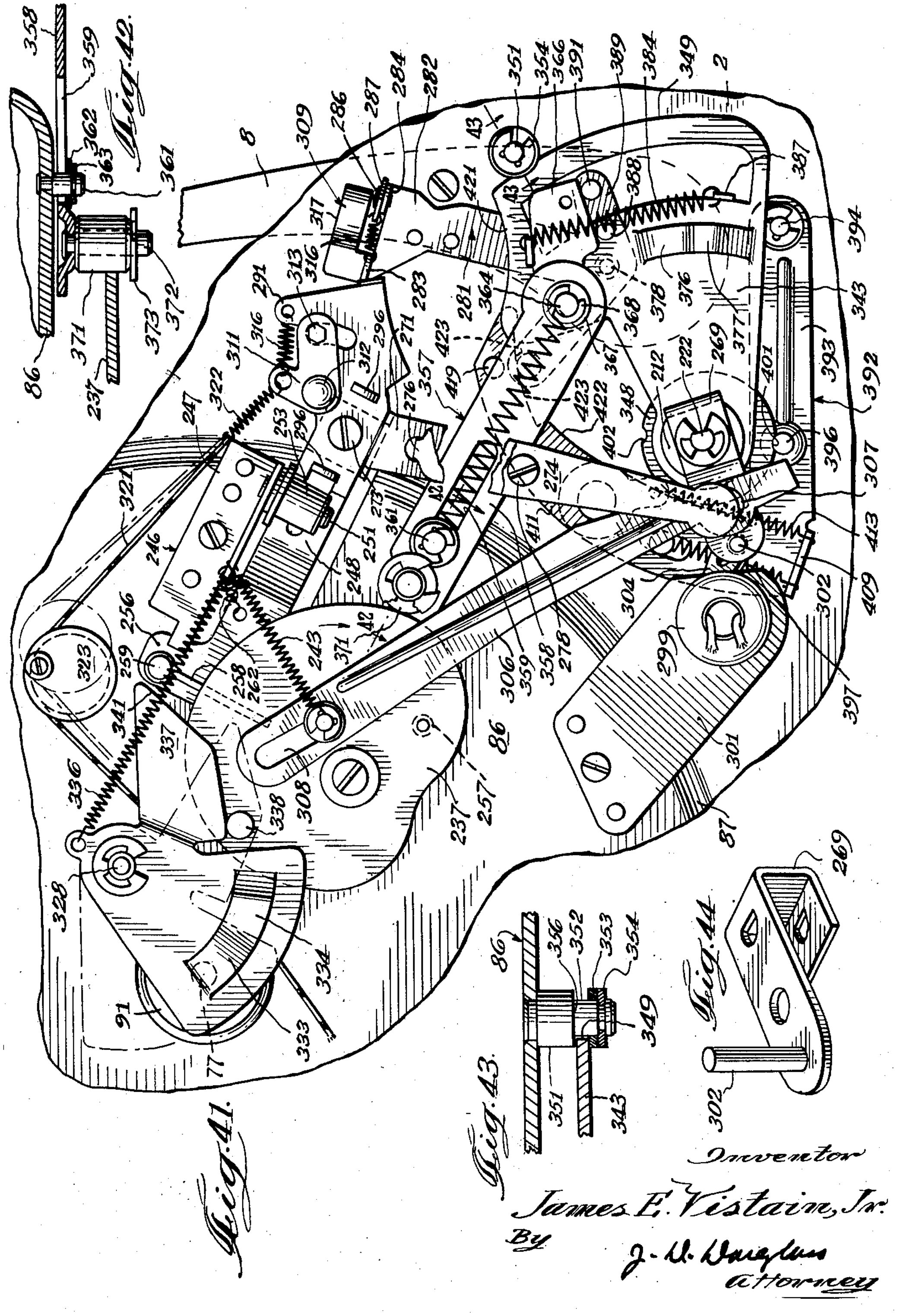
Fig. 41 is a bottom plan view corresponding to Fig. 30 showing the parts in a position they occupy at another stage of a record changing cycle.
Fig. 42 is a vertical section taken on line 42—42 of Fig. 41.
Fig. 43 is a vertical section on line 43—43 of Fig. 41 and Fig. 30.
Fig. 44 is a view of some of the elements of the crank mechanism, in perspective.
Figures 55, 56, 57:
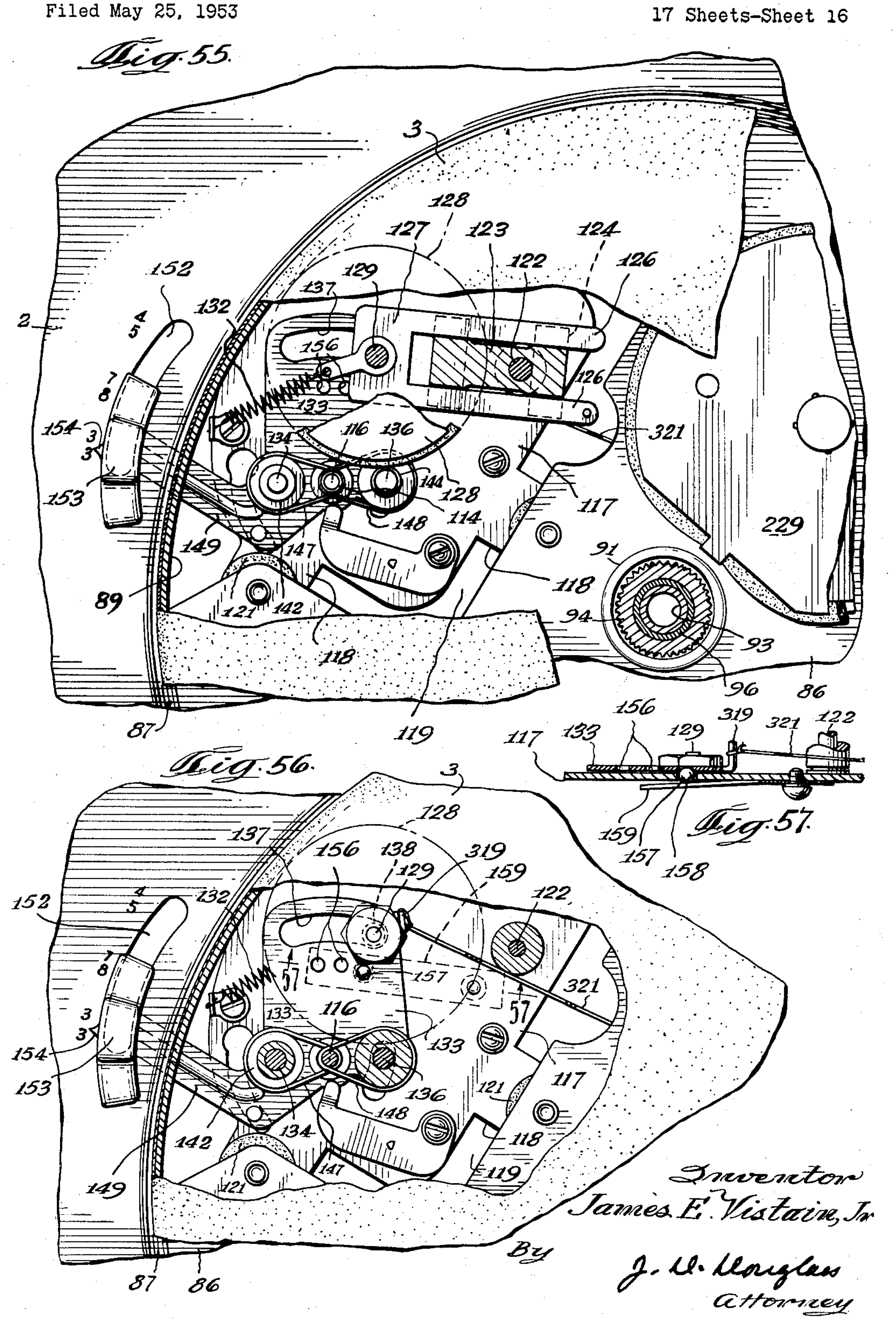
Fig. 55 is a fragmentary top plan view of the record player, the turntable being broken away to reveal other parts including the motive unit and control thereof in addition to the clutch means.
Fig. 56 is a view corresponding to Fig. 55, more parts thereof being broken away to show further details of the drive mechanism.
Fig. 57 is a vertical section on line 57—57 of Fig. 56.

The position follower lever 311 is adapted to be shifted concurrently with shifting of the position of handle 153 (Fig. 56) to change the speed of the turntable. The control plate 133 bears an ear 319 to which is anchored some flexible element 321 such as a cord or cable. At its other end, the cord is resiliently anchored to the follower lever 311 (Fig. 30) by a tension spring 322. The cord 321 is adapted to slide over a sheave 323 which performs two principal functions. First, it serves the purpose of deflecting the cord so that it avoids interference with parts of the record player mechanism. Secondly, since the sheave 323 is eccentrically clamped to the offset wall 86 by a screw 324, the sheave is adapted to be swung about said screw until the tension in cord 321 provided by spring 322 is nearly equal to the force of spring 316. Since the spring 316 exerts the greater force on follower lever 311, said lever is, of course, maintained in the extreme position indicated in Fig. 30. However, when the handle 153 is moved from its position shown in Fig. 59 to the other extreme position as indicated in Figs. 55 and 56, the force of spring 322 exceeds the force of spring 316. As a result, the screw 313 is carried to the opposite end of slot 314 as indicated in Fig. 41. While in this position, the tip of screw 313 is beyond the radius of the arc through which the cam 317 is carried by the inward swing of the pickup arm. This position of screw 313 is the result of moving handle 153 (Figs. 55 and 56) to a position in which the turntable is adapted to be operated at 33⅓ r.p.m. for microgroove records having spiral terminal grooves adapted to operate the ratchet mechanism.

When the handle 153 is moved to a position providing for operation of the turntable at 78 r.p.m. (Fig. 58) follower screw 313 is concurrently positioned centrally of slot 314. In this position also, the screw will not be engaged by the cam 317. Such engagement is unnecessary since records which are adapted to be reproduced at this speed have eccentric terminal grooves adapted to operate the trigger mechanism as previously indicated.

*Motor control*

Figures 45, 46:
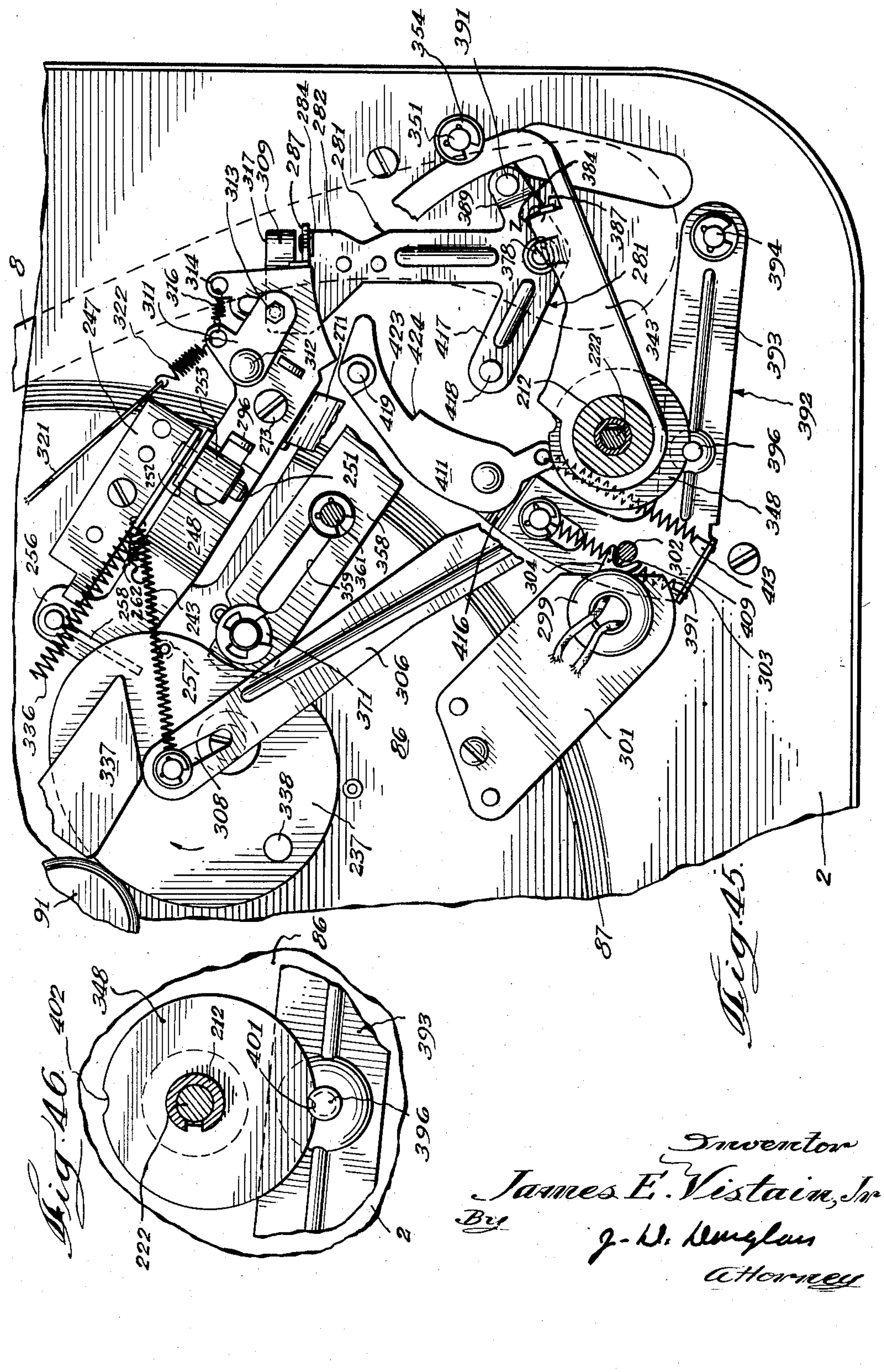
Fig. 45 is another bottom plan view corresponding to Fig. 30, some of the parts of which are in still another position.
Fig. 46 is horizontal section taken on line 46—46 of Fig. 31.

The operation of the motor is controlled from the ejector head 6 by turning the button 266 (Fig. 31) to start and stop the motor 113. This is made possible by means of a switch indicated in its entirety by the reference character 299. The switch is fixed to the wall 86 of the base plate by a bracket 301. A crank mechanism is provided by the rod 222 and arm 269 thereon. From the arm 269 a switch pin 302 extends upwardly and is adapted to be carried between a pair of fingers 303 of a bifurcated switch arm 304, (Fig. 45). Although the structure of the switch does not constitute a feature of the invention, and any other motor switch could be used, a characteristic of the switch is that when its arm 304 is moved slightly beyond a mid position between its "on" and "off" extreme limits the switch arm snaps to the nearest extreme position. As the pin 302 is swung clockwise about the axis of shaft 222, the switch 299 as viewed in Fig. 30 is opened. When pin 302 is carried counterclockwise the switch is, of course, snapped to closed position.

*Ejector mechanism*

When the crank pin 244 (Figs. 30 and 37) is carried through its orbit by cyclic operation of the friction wheel 229 the ejector head 6 is actuated to deliver a record of any of the types except R''' from the magazine to the turntable 3. This is made possible by a link 306 which is pivoted by a rivet 307 to the crank arm 269. The crank pin 244 passes through a slot 308 at the other end of the link 306 which is held thereon by a U-washer 245 engaging the pin below said link. It will be noted that there is lost motion between the crank pin 244 and the crank mechanism. This enables the switch pin 302 to be moved to open and close switch 299 without disturbing the position of cam 237. During a cycle of motion, the pin 244 strikes both ends of the slot 308 to move the link 306 and consequently to operate the ejector head 6 by rotating shaft 222 and eccentric 221. This provides for edgewise displacement of the bottom record of a stack, by push plate 216, from the support provided by plate 213, thereby enabling the bottom record to drop to the turntable, as previously described.

For changing the type of records R''', the reciprocatory element 26 (Fig. 15) is adapted to be moved axially of the center post 17 by operation of the movable member 79 as previously explained. In detail, member 79 comprises a cam plate 326 of generally triangular formation from one corner of which a hub 327 (Fig. 38) extends vertically upward. The wall 86 carries a bearing pin 328

(Fig. 15) extending downwardly from a point beside the socket 91. The lower portion of pin 328 is of reduced diameter thus providing a bearing portion 329 and a shoulder 331. The portion 329 is adapted to extend through the hub 327, which is confined between shoulder 331 and a C-washer 332 pinched about the lower end of said bearing portion. The member 79 includes a lift cam 333, remote from hub 327, of which a dwell or lowest portion thereof is represented by the character 334. The cam 333 is arcuate of the pin 328 and is biased toward the position indicated in Fig. 37, by a tension spring 336 anchored to plate 326 and bracket 249. The position of member 79 is normally maintained by the socket 91 which affords a stop against which spring 336 swings a cam arm 337 which is offset from but preferably an integral part of plate 326. As will be noted, the adjustment pin 77 of the reciprocatory element is, therefore, normally in intimate association with the dwell portion 334 when the center post 17 is anchored to the turntable. The cam arm 337, on the other hand, is in close proximity to the rotary cam 237 so that a follower pin 338, extending downwardly from said cam is adapted to strike arm 337 and swing it counterclockwise when the pin is carried about the axis of the cam during cyclic operation thereof. This operation causes an inclined portion 339 of the cam to lift the reciprocatory element 26 upwardly against the resistance of spring 81 for release of a record from support of the center post to the turntable. After the pin 338 has been carried past the free end of cam arm 337 spring 336 returns the dwell portion 334 to a position immediately beneath the reciprocatory member 26 so that spring 81 may return said reciprocatory member to its normal position. The cam surface 341, over which the follower pin 338 rides, is proportioned such that the member 79 is accelerated and decelerated properly, moving more slowly at the ends of its travel.

*Pickup arm operating mechanism*

The pickup arm is adapted to be removed from engagement with a record on the turntable and swung to a point beside the turntable by means including a swing-out mechanism indicated in its entirety by the reference character 342 (Fig. 30). The swing-out mechanism includes a control plate 343 generally triangular formation having a hub 344 (Fig. 31) and a bore 346 therein through which the sleeve 212 extends and about which the swing-out mechanism is adapted to be swung freely within limits, later to be indicated. The swing-out mechanism is confined against displacement axially of the sleeve 212, by a conventional U-shaped washer 347, pinching the lower end of the sleeve below the hub 344 and an eccentric member 348, later to be described, pinned to the sleeve above the swing-out mechanism. The control plate 343 includes an edge 349 (Fig. 30), which is arcuate of the sleeve 212, and which is supported additionally as follows: Rigidly mounted on the base plate 2 is a support stud 351 which has a section 352 (Fig. 43) of reduced diameter extending opposite the edge 349 of the control plate. A washer 353 is carried on the section 352, being retained on the section 352 by a U-shaped washer 354 pinching the end of the stud 331. The edge 349 of the plate 343 extends into the space between the washer 353 and a shoulder 356 on the stud and rests on the washer 353.

The swing-out mechanism 342 is adapted to be swung about the sleeve 212 (Fig. 31) by the rotary cam 237, cyclic motion of which is adapted to be communicated to the swing-out mechanism by means of a follower mechanism 357 (Figs. 30 and 41). In detail, the follower mechanism 357 comprises a follower link 358 having a slot 359, extending longitudinally thereof, and in which is received a guide pin 361 (Fig. 42) supported by and extending downwardly from the wall 86. The link 358 is slidable on the pin 361 and is anchored thereto by means including a washer 362 and U-shaped washer 363 disposed in a groove adjacent the lower end of the pin. At its right hand end, the link 358 is pivotally secured to the control plate by a pin 364 carried by said plate. A safety arm 366, later to be described, and sandwiched between the link 358 and control plate 343, is also adapted to pivot about pin 364, a washer 367 and U-shaped washer 368 being on pin 364 to prevent release of the link 358 and arm 366 from the pin. On its left hand end, in the figures, the link 358 carries a follower 371 rotatable on a pin 372 extending downwardly from the link 358 (Fig. 42), the follower 371 being retained on the pin preferably by a U-shaped washer 373. The swing-out mechanism is biased counterclockwise (Fig. 30) about the sleeve by a tension spring 374 anchored between the pins 361 and 364 but limited in its movement by engagement of the pin 361 and the right hand end of the slot 359. This is the position which the swing-out mechanism occupies during playing of a record and which will be hereinafter referred to as its "inward" position. Also while the swing-out mechanism is in its inward position, the follower 371 occupies a position adjacent to but spaced slightly from the rotary cam 237 when held in its stationary position by the finger 258 of the trigger mechanism. As cam 237 rotates through a cycle, however, it swings the swing-out mechanism clockwise or "outwardly" from its inward position, by pressure of its surface against the follower 371.

A lift cam 376 is provided on the control plate to rock the pickup arm 8 vertically. Said lift cam is formed as a depression in the plate 343 arcuate of the sleeve 212 and includes a dwell portion 377 at the lowest part of the depression. When the swing-out mechanism is in its inward position, a lift rod 378 (Fig. 52) journalled in the tubular shaft 164, rests against the dwell 377. The lift rod extends through the shaft 164, above which it bears in rigid connection therewith, a laterally extending arm 379 (Fig. 27) through the swingable end of which is threaded an adjustment screw 381 adapted to engage the lower bifurcated member 181. If desired, a helical spring 382 may be coiled about screw 381 between the head thereof and arm 379 to hold the screw in its adjusted position. By turning screw 381 the elevation of the free end of the pickup arm, when in cycle, is adapted to be regulated. The arm 379 is between the arms 176. Swinging of the swing-out mechanism is immediately preceded by movement of the dwell 377 of the lift cam out from under the lift rod 378 so that the rod is moved axially upward thereby rocking the pickup arm upwardly about the pivotal members 182.

After the pickup arm has been rocked upwardly by the lift cam 376, the swing-out mechanism engages the spider mechanism 281 to swing the pickup arm outwardly. Mechanism to carry this into effect includes the safety arm 366 (Fig. 30). It extends over an aperture 383, arcuate about the sleeve 212, in the control plate 343. The safety arm 366 is biased clockwise about the pin 364 by a tension spring 384 anchored between an ear 386 struck downwardly from arm 366 and an ear 387 struck downwardly from the plate 343. Rotation of the arm 366, in a clockwise direction, is limited, however, by a pin 388 on the control plate 343. The spider mechanism (Figs. 30, 48 and 51) includes an arm 389 carrying at its free end a follower 391 extending into the aperture 383 and adapted to be engaged by the safety arm 366 as the swing-out mechanism is swung outwardly to move the pickup arm also outwardly and make way for transfer of an unplayed record from the magazine to the turntable.

As will now be understood, should outward movement of the pickup arm be forcibly resisted, or should the pickup arm be forced inwardly about its axis after being carried to some point remote from its extreme inward position, then the safety arm 366 is merely swung away from the stop in 388 against the resistance of spring 384 and no part of the record player will be deformed or broken.

Figures 47, 48:
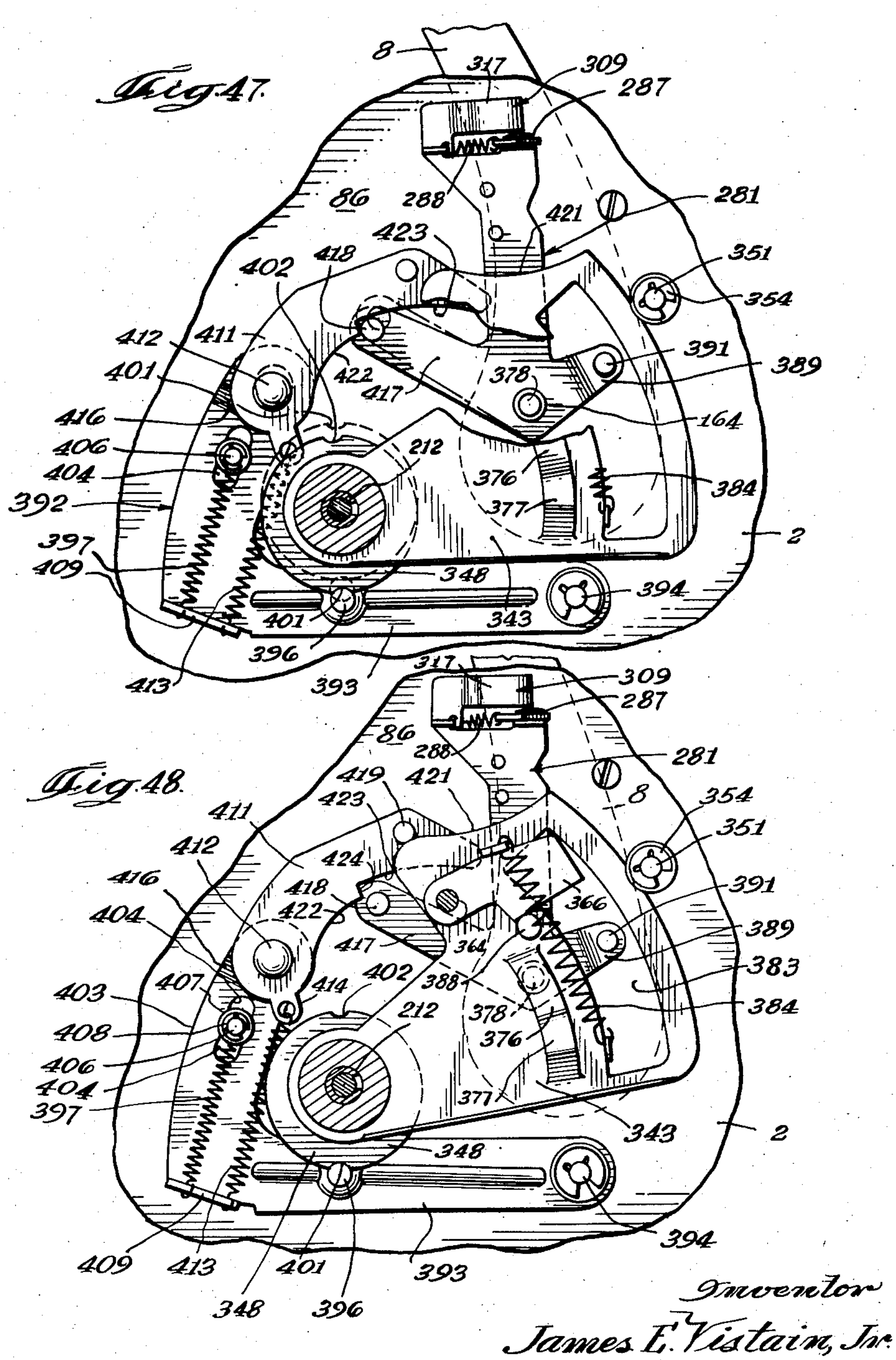
Fig. 47 is a fragmentary bottom plan view, partly in section, of mechanism depicted in Fig. 45 showing another position the parts occupy in controlling the pickup arm.
Fig. 48 is a view corresponding to Fig. 47 showing the parts in still other positions they occupy in controlling the operation of the pickup arm.

Although means to urge the pickup arm resiliently in one direction has just been described, additional means to carry the pickup arm yieldably in the opposite direction is also provided. It includes a positioning mechanism indicated in its entirety by the reference character 392 (Figs. 47 and 48). In detail, it includes a substantially L-shaped positioning arm 393 which is pivoted, at one end thereof, to the base plate 2 by a stud 394. The arm 393 extends past the sleeve 212 and carries a pin 396 which extends downwardly, from said arm, and is pressed into engagement with the eccentric member 348 by a tension spring 397. More specifically, the eccentric member 348 includes a hub portion 398 (Fig. 31) from the periphery of which an eccentric flange 399 extends. In the peripheral surface of the flange at a point farthest from the axis of the sleeve 212 is a notch 401 (Fig. 46) while diametrically opposite thereto is another notch 402. The pin 396 is adapted to be pressed into one of the notches 401 or 402, and since the hub 398 is secured to the sleeve 212, the ejector head 7 is maintained in whichever position it is turned to provide support for the two larger sizes of records which the machine is capable of playing with spindle 4. The notches 401 and 402 being comparatively shallow, the ejector head may readily be turned manually to move the pin 396 out of the notches against the force of spring 397. A lateral extension 403 of the arm 393 is provided with a slot 404, arcuate of the pin 394, and through which a pin 406 extends downwardly from the base plate 2. If desired, means such as a washer 407 and U-shaped washer 408 may be applied to the pin 406 to support the arm 393 against downward displacement. A stationary support for one end of the spring 397 is thus provided by the pin 406 while the remaining end of said spring is attached to a flange 409 bent downwardly from the arm 393.

The tone arm positioning mechanism also includes a positioning dog or set down dog 411 which is substantially arcuate in formation and is pivotally connected at one end thereof to the free end of the lateral extension 403 of the positioning arm by a rivet 412. The dog 411 is urged toward a normal position by a tension spring 413 anchored between the flange 409 and an ear 414 of the positioning dog, the normal formation of the positioning mechanism being substantially U-shaped due to the location of ear 414 and the tension of spring 413. In order that the ear 414 may be carried under the free end of a pin 406 without interference, the extension 403 is offset at 416.

The spider mechanism 281 includes a third arm 417, the free end of which carries a downwardly extending pin or follower 418 which is, during a record changing cycle, adapted to be in engagement with the positioning dog 411. Partly to provide freedom for movement of the spider 281 during record playing, however, the dog 411 includes a pin 419 which extends into the plane through which the arm 343 of the swing-out mechanism is adapted to swing. The plate 343 includes a cam surface 421 adapted to engage the pin 419 to hold the positioning dog 411 away from the orbit through which the pin 418 on the spider 281, is carried during inward movement of the pickup arm when a record is being played.

As previously indicated, the swing-out mechanism is first turned clockwise from the Fig. 30 position during a record changing cycle and in this operation the safety arm 366 is carried into engagement with the pin 391 on the spider mechanism and thus swings the pickup arm outwardly. At the same time, since the cam surface 421 is moved away from the pin 419, the positioning dog 411 is swung nearer to the spider mechanism, by the spring 413. Rotation of the spider mechanism carries the pin 418 into engagement with the positioning dog. In so doing, the pin 418 first engages a curvilinear side portion 422 over which it slides as the dog 411 is swung away from the spider mechanism. The pin then passes on to a cam portion 425 (Fig. 47) which extends from a positioning surface or heel 424 to the free end of the positioning dog. In the course of its passage over the surfaces 422 and 423, the pin 418 of the spider mechanism 281, and consequently the pickup arm, are yieldably held against movement in both directions, being controlled by both the swing-out mechanism 342 and the positioning mechanism 392 for the greater part of their movement. After a record is dropped from the magazine and the swing-out mechanism returns toward its inner position, the pressure exerted by the cam portion 423 against pin 418 swings the spider mechanism inwardly. The pickup arm is also concurrently swung inwardly, the pin 418 sliding along the surface 423 of the positioning dog 411 until the pin 418 engages the heel 424 which stops the sliding action of said pin. This holding cooperation of the heel 424 with pin 418 provides the "let-down" position for the pickup arm. When in its let-down position, the needle of the pickup arm is directly over the beginning of the sound groove of a record when supported by the turntable. While the pickup arm is thus detained in its let-down position, the dwell portion 377 of the let-down cam is carried under the lift rod 378, thereby lowering the pickup arm into engagement with the record to be reproduced. Also at substantially the same time that the pickup arm engages the record, the cam surface 421 of the swing-out mechanism, which is being moved counter-clockwise, as viewed in Fig. 48, engages the pin 419 on the positioning dog, after which the remaining motion of the swing-out mechanism inwardly, swings the positioning dog out of engagement with pin 418 freeing the spider mechanism which may now be rotated, without interference, by the pickup arm as it is carried across a record by the sound grooves thereon.

As previously indicated, provision is made to secure the ejector head 7 releasably in whichever position it is turned by means of the spring-pressed pin 396 and the notched eccentric member 348. Owing to the difference in spacing of the notches 401 and 402 from the axis about which the eccentric member 348 is rotatable, the position of the arm 393 and consequently of the heel 424 (Fig. 45) is changed whenever the position of the ejector head is shifted between 10-inch record capacity and 12-inch record capacity. This effectively compensates for the difference between the position of the beginning of the sound groove of a 10-inch record and a 12-inch record so that whenever the ejector head is adjusted to support a stack of 10-inch records the pickup arm will be lowered at a point where the beginning of the sound groove of a record of this size occurs when supported by the turntable; also, when the ejector head is turned from the 10-inch record position to a position in which it is adapted to support a stack of 12-inch records then the pickup arm is similarly lowered into engagement with the beginning of the sound groove of a 12-inch record when it is supported by the turntable. When a 7-inch record is played, the adjustment of the handle 14 on the pickup arm adjusts the position of the arm properly to engage the starting groove of this smaller record.

Having thus described my invention in an embodiment thereof, I am aware that numerous and extensive departures may be made therefrom without departing from the spirit or scope of the appended claims.

I claim:

1. In an operating mechanism for an automatic record changer for playing a plurality of classes of records having a turntable, a multispeed motor drive connected thereto, a control plate for controlling the operation of said drive, and a pickup arm, said mechanism having a trigger means including a lever adapted to be tripped when said pickup arm reaches the runout groove of one of said records, trip mechanism for said trigger means adapted to be operated alternately either by the eccentric runout grooves of one class of records or the spiral concentric runout groove of another class dependent on the position of said control plate, comprising a pawl arm fixed to said pickup arm, a pawl pivotally carried at the end of said arm and positioned for engagement with said trigger means to trip it when said pickup arm engages an eccentric runout groove, a cam surface on said pawl arm, an arm pivotally mounted on said trigger lever near an end thereof, a pin carried by said pivoted arm, said pivoted arm connected to and arranged to be swung about its pivot by said control plate, said pin arranged to be in position disposed in the path of travel of and to be engaged by said cam surface at one position of said pivoted arm and not to be engaged at another position of said arm, said engagement being such to trip said trigger means.

2. In an automatic record changer for playing a plurality of classes of records having a turntable, a multispeed drive motor connected thereto, a control plate for controlling the operation of the drive, and a pickup arm, an operating mechanism for selectively initiating a record changing cycle when said pickup arm engages an eccentric runout groove of one class of records or a spiral runout groove of another class; said mechanism having a tringger means comprising, a pawl arm and a pawl carried thereby fixed to said pickup arm, a cam member attached to said pawl arm, a cam surface on said cam member, a ratchet plate adjustably secured to a pivoted member, said member being rotated about its pivot when said pawl engages with said ratchet plate when said pickup arm enters the eccentric run-out groove of one class of records, an arm pivotally connected to said ratchet plate and connected to said control plate, an opening in said ratchet plate through which an adjustable striker member attached to said pivotally connected arm extends and which is in the rotational path of travel of said cam member when said pickup arm enters the spiral groove of said class of records, said striker member engaging the cam surface on said cam member whereby a force is transmitted by said cam member to said ratchet plate to trigger said mechanism for starting a record changing cycle.

3. In an automatic record changer for playing a plurality of classes of records having a turntable, a multispeed drive motor connected thereto, a control plate for controlling the operation of the drive, and a pickup arm; an operating mechanism for selectively initiating a record changing cycle when said pickup arm engages an eccentric runout groove of one class of records or a spiral runout groove of another class, said mechanism having a trigger means comprising, a pawl arm fixed to said pickup arm, a pawl pivotally connected to the end of said pawl arm, a ratchet plate adjustably secured to a pivoted member, said member being rotated about its pivot when said pawl acts upon said ratchet plate when said pickup arm enters the eccentric runout groove of one class of records, a cam member carried by said pawl arm, a cam surface on said cam member, an arm pivotally connected to said ratchet plate, an elongated opening in said ratchet plate through which an adjustable striker pin attached to said arm extends and which is in the rotational path of travel of said cam member when the pickup arm enters the spiral groove of another class of records, spring means connected to said control plate and said arm to bias said arm and striker pin to an inoperative position when playing records having an eccentric runout groove, a second spring means attached to said pivoted arm and said ratchet plate, an eccentric sheave member, a cord member carried by said sheave member and connected between said control plate and said first spring whereupon when said control plate is moved to control the turntable driving means for playing records having a spiral runout groove, said second spring means overcomes the oppositely biasing effect of said first spring means to rotate said pivoted arm to position said striker pin in the path of travel of said cam member whereby said cam member arranged to engage said striker pin and depress it and said ratchet plate to trigger said mechanism for starting a record changing cycle.

4. A phonograph record changer wherein means is provided for effecting a record changing cycle and a pickup arm is arranged to track records having different types of terminal grooves for starting a record changing cycle including a turntable, a multispeed turntable drive means connected to the turntable for rotating the turntable at different speeds, a movable controller associated with the drive means to vary the speed of the turntable, means for starting the record changing cycle including a clutch, means effecting engagement of the clutch controlled by the tone arm comprising a pivotally supported lever mechanism having a trigger for engaging the clutch, said lever mechanism having an end portion provided with ratchet teeth on one side thereof and connected thereto a pivoted lever having an abutment arranged to be moved to alternate positions supported by the lever mechanism near the end thereof and spaced from the ratchet teeth, means for connecting said pivoted lever to said movable controller to effect simultaneous movement therewith, an arm connected to and movable with the pickup arm, said arm having a pawl for engagement with said ratchet teeth for moving the lever upon reverse movement of the arm and a spring cam adjacent the arm disposed for engagement with said abutment upon predetermined forward movement of the arm.

References Cited in the file of this patent

UNITED STATES PATENTS

| | | |
|---|---|---|
| 2,520,251 | Mullaney | Aug. 29, 1950 |
| 2,527,646 | Mullaney | Oct. 31, 1950 |
| 2,616,702 | Erwood et al. | Nov. 4, 1952 |
| 2,650,831 | Fortune et al. | Sept. 1, 1953 |